United States Patent [19]

Ito et al.

[11] Patent Number: 5,461,521
[45] Date of Patent: Oct. 24, 1995

[54] MAGNETIC DISK UNIT CONTROL METHOD FOR REMOVING DUST FROM A DISK

[75] Inventors: Nobuhiko Ito, Tokyo; Yusuke Watanabe, Isehara; Kazuhiro Chigita, Yokohama, all of Japan

[73] Assignee: Ricoh Company, Ltd., Tokyo, Japan

[21] Appl. No.: 958,147

[22] Filed: Oct. 5, 1992

[30] Foreign Application Priority Data

Oct. 17, 1991 [JP] Japan ................... 3-296526

[51] Int. Cl.⁶ ................................ G11B 27/36
[52] U.S. Cl. ................................ 360/75; 360/128
[58] Field of Search ................ 360/75, 77.02, 360/102–103, 105, 31, 128, 53, 133, 135; 369/71

[56] References Cited

U.S. PATENT DOCUMENTS

| | | | |
|---|---|---|---|
| 3,731,289 | 5/1973 | Bajgert et al. | 360/128 |
| 4,516,165 | 5/1985 | Cunningham et al. | 360/53 |
| 4,816,938 | 3/1989 | Cowen et al. | 360/75 |
| 5,055,949 | 10/1991 | Kawakami | 360/75 X |
| 5,196,974 | 3/1993 | Higayashi et al. | 360/103 |
| 5,251,077 | 10/1993 | Saitoh | 360/53 |
| 5,323,276 | 6/1994 | Ono | 360/53 |

FOREIGN PATENT DOCUMENTS

| | | |
|---|---|---|
| 57-200971 | 3/1983 | Japan . |
| 62-162217 | 12/1987 | Japan . |
| 0296989 | 6/1990 | Japan . |

*Primary Examiner*—Andrew L. Sniezek
*Assistant Examiner*—Jim L. Habermehl
*Attorney, Agent, or Firm*—Cooper & Dunham

[57] ABSTRACT

In a magnetic disk unit, a magnetic head slider member for holding a magnetic head is floated from a recording face of a magnetic disk by an air flow caused by a high speed rotation of the magnetic disk. The magnetic disk unit has a magnetic head moving device for rotatably supporting the magnetic head slider member and positioning the magnetic head in a radial direction of the magnetic disk. A control method of the magnetic disk unit has the steps of reciprocating the magnetic head slider member a predetermined number of times at a high speed in a predetermined range in the radial direction of the magnetic disk by using a position of the magnetic head slider member as a reference in the radial direction of the magnetic disk provided when it is detected that a data error is included in reproduced data at a reproducing time of recorded data; and again reproducing the same recorded data after the reciprocating movement of the magnetic head slider member. Other control methods of the magnetic disk unit are also shown.

8 Claims, 18 Drawing Sheets

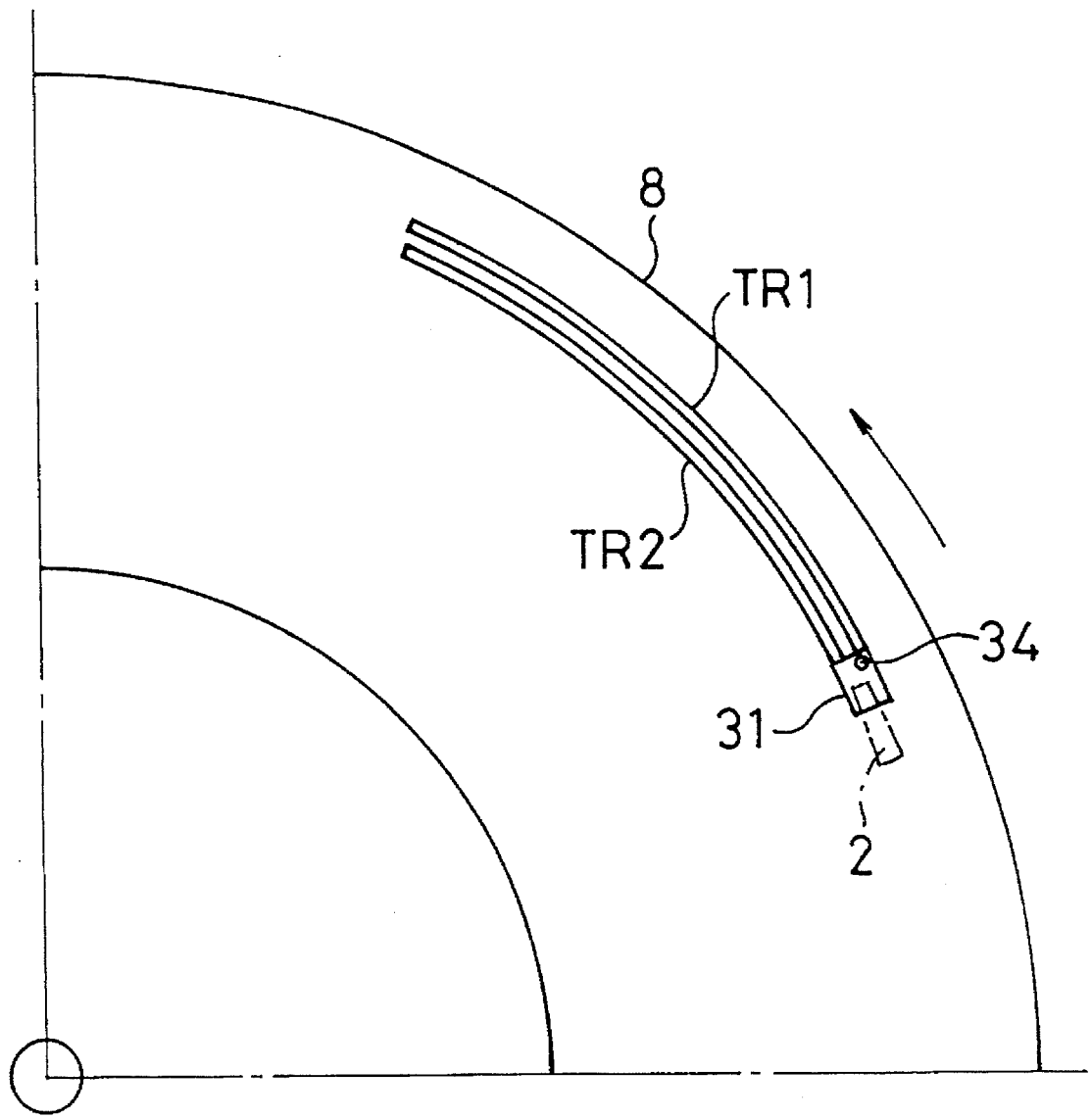

MAGNETIC DISK UNIT CONTROL METHOD FOR REMOVING DUST FROM A DISK

BACKGROUND OF THE INVENTION

1. Field of the Invention

The present invention relates to a magnetic disk unit in which a magnetic head slider member for holding a magnetic head is floated from a recording face of a magnetic disk by an air flow caused by a high speed rotation of the magnetic disk, and the magnetic disk unit has a magnetic head moving means for rotatably supporting this magnetic head slider member and positioning the magnetic head in a radial direction of the magnetic disk. The present invention also relates to a method for controlling an operation of the magnetic disk unit.

2. Description of the Related Art

In a general magnetic disk unit, a magnetic head slider member for holding a magnetic head is floated from a recording face of a magnetic disk by an air flow caused by a high speed rotation of the magnetic disk. Thus, a small distance between the magnetic head and the recording face of the magnetic disk is held. Further, a data recording density with respect to the magnetic disk is improved by reducing a floating height of this magnetic head.

When dust is attached onto the data recording face of the magnetic disk used as a recording medium, a reproducing output of the magnetic head is reduced, or no data are suitably recorded in an attaching portion of this dust.

For example, Japanese Patent Application Laying Open (KOKAI) No. 3-58363 has proposed a method for removing the dust attached onto the recording face of the magnetic disk. In this method, a skew angle formed between a recording track and an outside face of the magnetic head slider member is suitably held to remove the dust from the outside face of the magnetic head slider member by sending the dust flying.

However, such a general method has the following problems.

Namely, a magnetic head moving mechanism for moving the magnetic head member holding the magnetic head in a radial direction of the magnetic disk is generally divided into moving mechanisms of two kinds of a linear driving type and a rotary driving type. In the magnetic head moving mechanism of the linear driving type, the magnetic head slider member is reciprocated in a direction parallel to the radial direction of the magnetic disk. In the magnetic head moving mechanism of the rotary driving type, the magnetic head slider member is rotatably supported and the magnetic head is reciprocated in an arc shape.

When the magnetic head moving mechanism of the rotary driving type is used, the skew angle between the recording track and the magnetic head slider member is changed so that no dust removing effects can be sufficiently obtained.

SUMMARY OF THE INVENTION

It is therefore an object of the present invention to provide a magnetic disk unit and a control method thereof in which dust attached onto a magnetic disk can be also effectively removed therefrom in the magnetic disk unit using the magnetic head moving mechanism of the rotary driving type.

The above object of the present invention can be achieved by a control method of a magnetic disk unit in which a magnetic head slider member for holding a magnetic head is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This control method comprises the steps of reciprocating the magnetic head slider member a predetermined number of times at a high speed in a predetermined range in the radial direction of the magnetic disk by using a position of the magnetic head slider member as a reference in the radial direction of the magnetic disk provided when it is detected that a data error is included in reproduced data at a reproducing time of recorded data; and again reproducing the same recorded data after the reciprocating movement of the magnetic head slider member. In this control method of the magnetic disk unit, the predetermined range in the radial direction is preferably set to be wider than at least a size of the magnetic head slider member in a width direction thereof. Further, in this control method of the magnetic disk unit, the predetermined range in the radial direction is preferably set such that a data reproducing position is an intermediate position in the radial direction of the magnetic disk.

The above object of the present invention can be also achieved by a control method of a magnetic disk unit in which a magnetic head slider member for holding a magnetic head is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This control method comprises the steps of reciprocating the magnetic head slider member at a high speed in a predetermined range in the radial direction of the magnetic disk by using a position of the magnetic head slider member as a reference in the radial direction of the magnetic disk provided when it is detected that a data error is included in reproduced data at a reproducing time of recorded data; a reciprocating operation of the magnetic head slider member being performed a predetermined number of times by shifting starting timing of this reciprocating operation; and again reproducing the same recorded data after the reciprocating operation of the magnetic head slider member.

The above object of the present invention can be also achieved by a control method of a magnetic disk unit in which a magnetic head slider member for holding a magnetic head is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This control method comprises the steps of reciprocating the magnetic head slider member a predetermined number of times at a high speed in a predetermined range in the radial direction of the magnetic disk including a data reproducing position provided when it is detected that a data error is included in reproduced data at a reproducing time of recorded data; and again reproducing the same recorded data after the reciprocating movement of the magnetic head slider member.

The above object of the present invention can be also achieved by a control method of a magnetic disk unit in which a magnetic head slider member for holding a magnetic head is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This control method comprises the steps of holding the magnetic head slider member for a predetermined time in a position in the radial direction of the magnetic disk provided when it is detected that a data error is included in reproduced data at a reproducing time of recorded data; and again reproducing the same recorded data after the holding of the magnetic head slider member.

The above object of the present invention can be also achieved by a control method of a magnetic disk unit in which a magnetic head slider member having a magnetic head attached to one of a pair of side rail members arranged in a longitudinal direction thereof is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This control method comprises the steps of holding the other side rail member having no magnetic head in the magnetic head slider member for a predetermined time in a state in which the other side rail member is moved to a position of the magnetic head in the radial direction of the magnetic disk located at a reproducing time of recorded data when it is detected that a data error is included in reproduced data at the reproducing time; and again reproducing the same recorded data after the holding of the other side rail member.

The above object of the present invention can be also achieved by a control method of a magnetic disk unit in which a magnetic head slider member having a magnetic head attached to one of a pair of side rail members arranged in a longitudinal direction thereof is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This control method comprises the steps of holding the other side rail member having no magnetic head in the magnetic head slider member for a predetermined time in a state in which the other side rail member is moved to a position of the magnetic head in the radial direction of the magnetic disk located at a reproducing time of recorded data when it is detected that a data error is included in reproduced data at the reproducing time; again reproducing the same recorded data after the holding of the other side rail member; reciprocating the magnetic head slider member a predetermined number of times at a high speed in a predetermined range in the radial direction of the magnetic disk by using a position of the magnetic head slider member as a reference in the radial direction of the magnetic disk provided when it is detected that a data error is included in the data again reproduced; and again reproducing the same recorded data after the reciprocating movement of the magnetic head slider member.

The above object of the present invention can be also achieved by a magnetic disk unit in which a magnetic head slider member for holding a magnetic head is floated from a recording face of a magnetic disk by an air flow caused by a high speed rotation of the magnetic disk, and the magnetic disk unit has magnetic head moving means for rotatably supporting the magnetic head slider member and positioning the magnetic head in a radial direction of the magnetic disk. This magnetic disk unit comprises data error detecting means for detecting that a data error is included in reproduced data; and control means for again reproducing the same recorded data after the magnetic head slider member is reciprocated a predetermined number of times at a high speed in a predetermined range in the radial direction of the magnetic disk by using a position of the magnetic head slider member as a reference in the radial direction of the magnetic disk provided when the data error detecting means detects the data error.

In accordance with the above magnetic disk unit and each of the control methods thereof, the magnetic head slider member is reciprocated in the radial direction of the magnetic disk such that an outside face of the magnetic head slider member can hit against dust. Accordingly, the dust attached to the magnetic disk can be effectively removed therefrom. Further, dust attached onto a recording face of the magnetic disk is removed therefrom by the side rail members of the magnetic head slider member. Accordingly, the dust can be efficiently removed from a recording region in which a data error is caused at the reproducing time.

Further objects and advantages of the present invention will be apparent from the following description of the preferred embodiments of the present invention as illustrated in the accompanying drawings.

BRIEF DESCRIPTION OF THE DRAWINGS

FIG. 4 is a schematic view for explaining one method for removing dust;

DESCRIPTION OF THE PREFERRED EMBODIMENTS

The preferred embodiments of a magnetic disk unit and a control method thereof in the present invention will next be described in detail with reference to the accompanying drawings.

Figure 1:
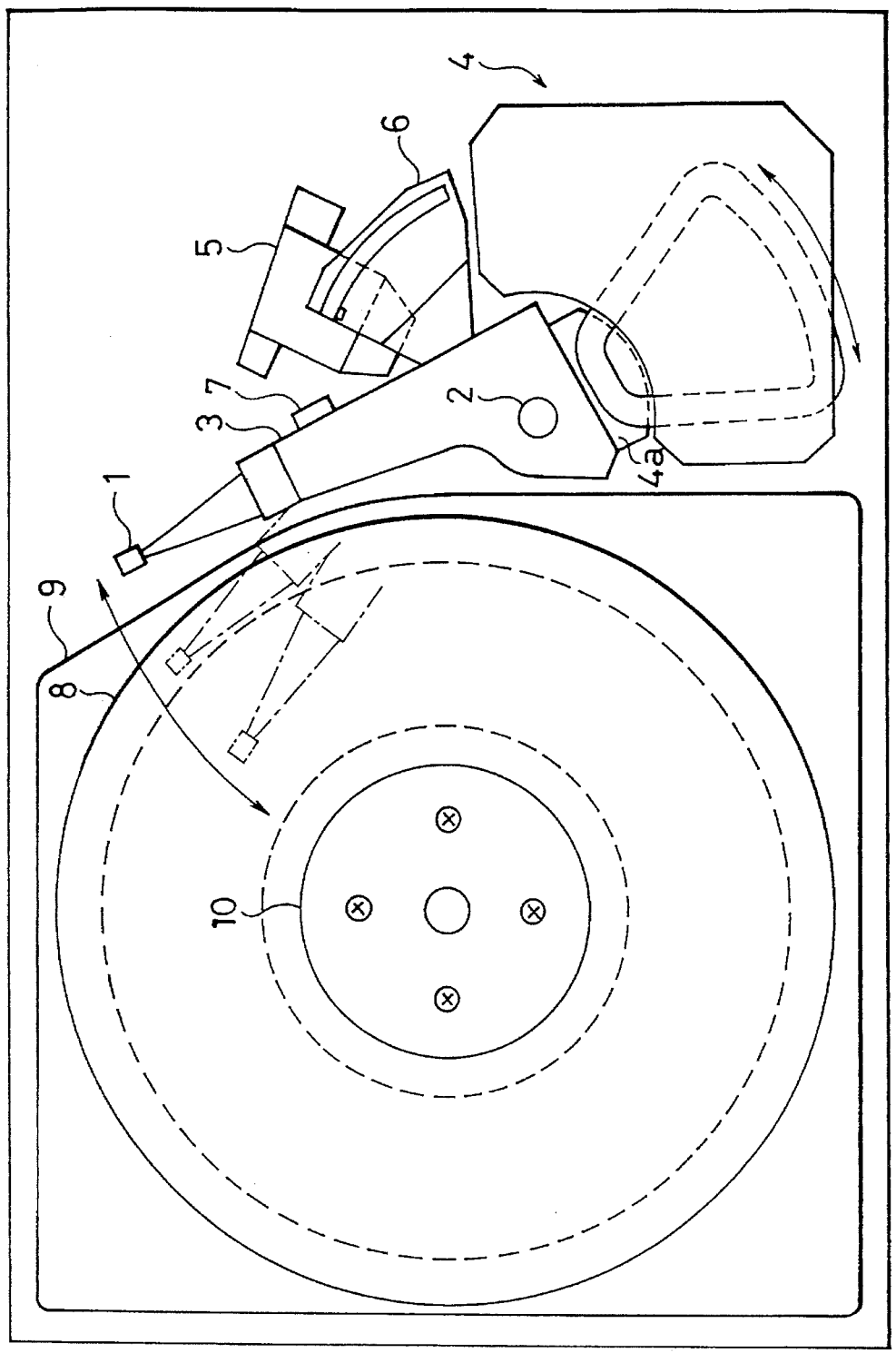
FIG. 1 is a view showing the schematic construction of a magnetic disk unit of a medium exchanging type in accordance with one embodiment of the present invention.

FIG. 1 shows the schematic construction of a head access mechanism in a magnetic disk unit in accordance with one embodiment of the present invention. This magnetic disk unit is a magnetic disk unit of a medium exchanging type in which memory media can be exchanged.

In FIG. 1, a magnetic head 1 is attached to one end portion of an arm member 3 rotatably supported by a shaft 2. A driving coil member 4a of a voice coil motor 4 for swinging the arm member 3 is attached to another end portion of this arm member 3. An encoder member 6 of a sensor mechanism 5 constitutes a pulse encoder and is attached to the arm member 3. An engaging member 7 is disposed to set a limit position of the arm member 3 in an outside moving range thereof.

A magnetic disk 8 is mounted to the magnetic disk unit in a state in which the magnetic disk 8 is stored into a disk cartridge 9. A disk hub 10 is attached to a central portion of the magnetic disk 8. An unillustrated turn table is additionally disposed in an unillustrated spindle motor of the magnetic disk unit and is magnetically connected to this disk hub 10. Thus, the magnetic disk 8 is rotated by the spindle motor.

As shown by a solid line in FIG. 1, the arm member 3 is moved to a limit position of the magnetic disk 8 in an outer circumferential direction thereof before the disk cartridge 9 is mounted to the magnetic disk unit. When the disk cartridge 9 is mounted to the magnetic disk unit, the arm member 3 is moved in an inner circumferential direction of the magnetic disk. Further, the magnetic head 1 is moved upward and downward with respect to a surface of the magnetic disk 8 by an unillustrated additional mechanism for loading/unloading the magnetic head in accordance with a moving position of the arm member 3. The loading/unloading mechanism is additionally disposed in the magnetic head 1.

Figure 2:
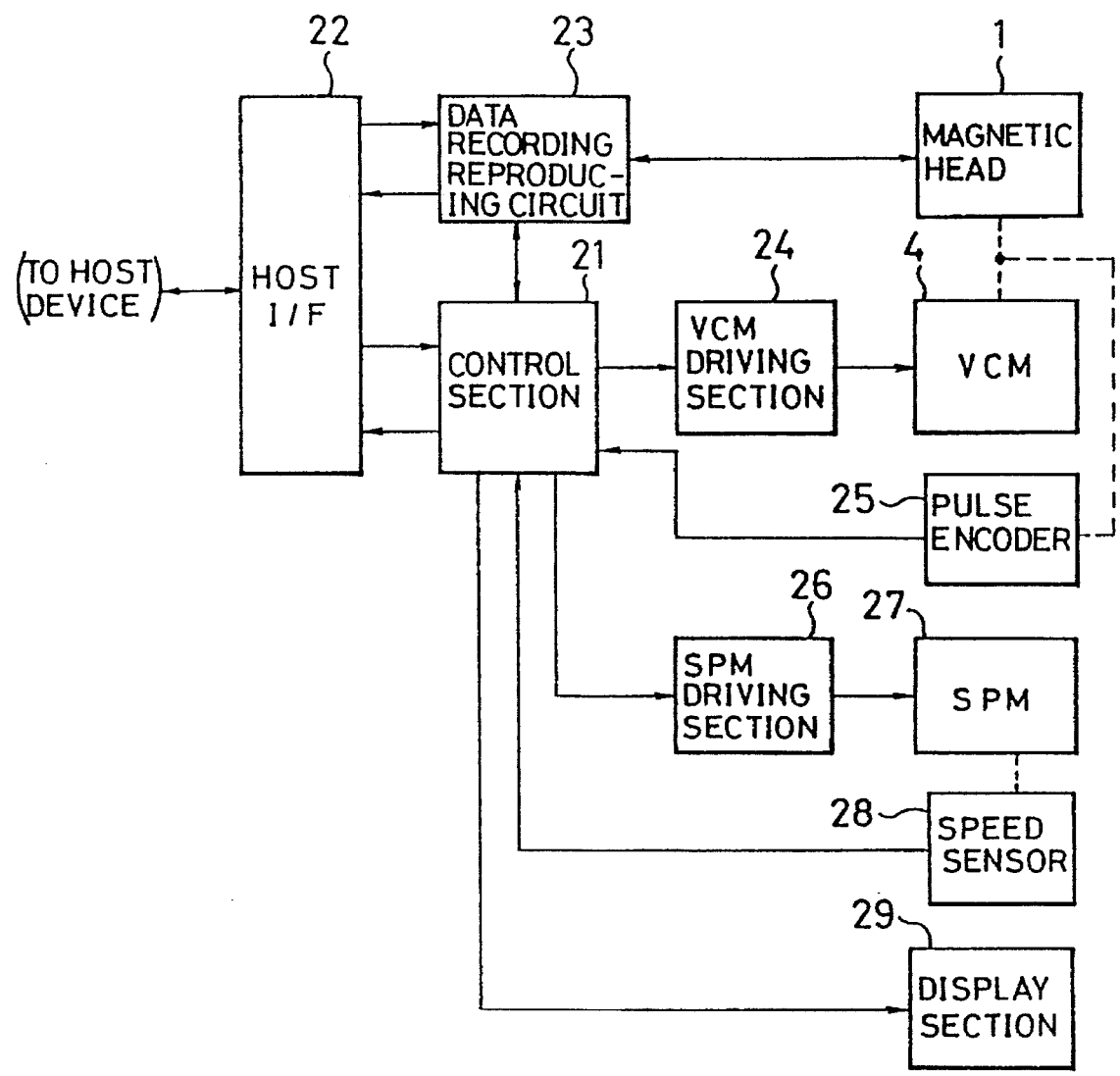
FIG. 2 is a block diagram illustrating a control system of the magnetic disk unit shown in FIG. 1.

FIG. 2 shows one example of a control system of the magnetic disk unit in accordance with one embodiment of the present invention.

A control section 21 controls an operation of the magnetic disk unit. A host interface circuit 22 transmits and receives various kinds of information between the control section 21 and a host device such as a personal computer. A data recording reproducing circuit 23 records and reproduces data from the magnetic disk 8 by using the magnetic head 1. The data recording reproducing circuit 23 adds a predetermined error detecting code or an error correcting code to recorded data. The data recording reproducing circuit 23 detects that a data error is included in reproduced data with reference to the error detecting code included in the reproduced data. Further, the data recording reproducing circuit 23 corrects the data error included in the reproduced data with reference to the error correcting code included in the reproduced data and has a function for detecting that an uncorrectable data error is caused. When the data recording reproducing circuit 23 detects the data error, the data recording reproducing circuit 23 transmits this data error to the control section 21.

A driving electric current having polarity and intensity corresponding to a control signal S1 outputted from the control section 21 is applied to the voice coil motor 4 by a voice coil motor driving section 24.

A pulse encoder 25 detects the movement of the arm member 3 in the sensor mechanism 5. A detecting signal of the pulse encoder 25 is inputted to the control section 21. Thus, the control section 21 detects the movement of the arm member 3 based on the detecting signal of the pulse encoder 25 so that a position and a speed of the magnetic head 1 are detected.

A spindle motor driving section 26 drives a spindle motor 27 for rotating the magnetic disk 8 in accordance with a driving signal S2 outputted from the control section 21.

A speed sensor 28 detects a rotational speed of the spindle motor 27. A detecting signal of the speed sensor 28 is inputted to the control section 21.

A display section 29 displays an operating state of the magnetic disk unit, etc. An operation of the display section 29 is controlled by the control section 21.

Figure 3A:
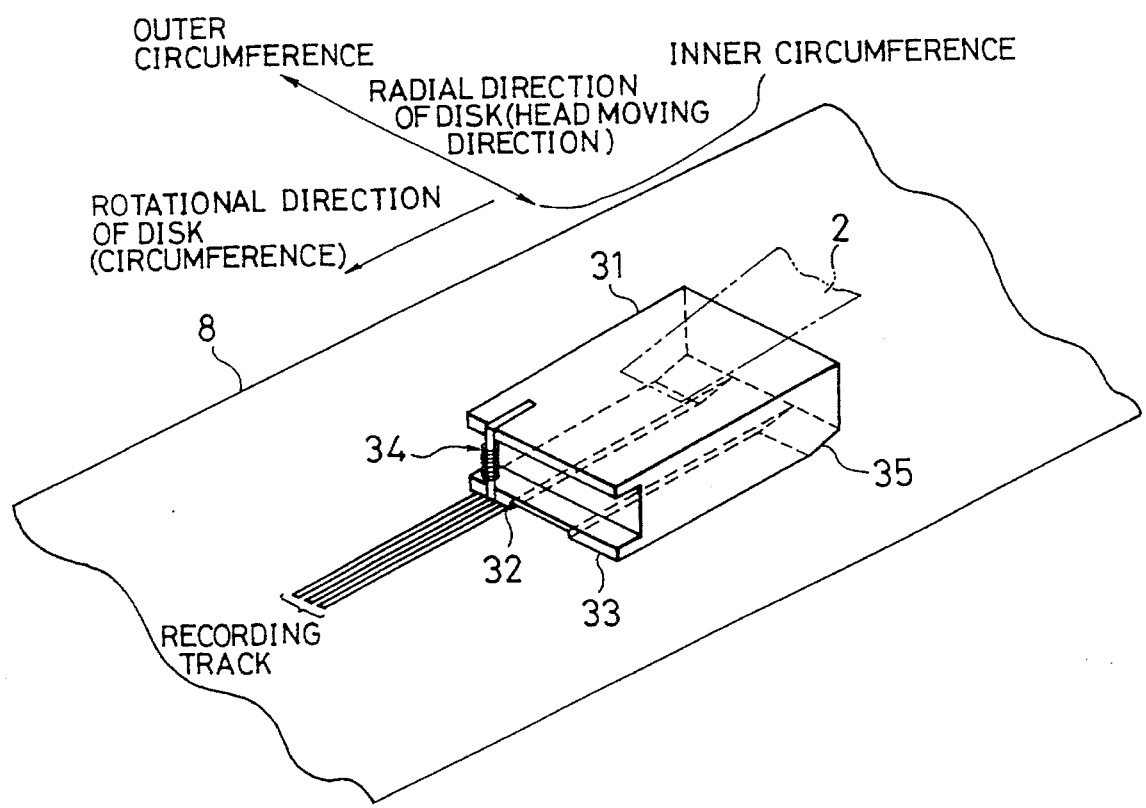
FIGS. 3a and 3b are views showing the schematic construction of a magnetic head slider member.
Figure 3B:
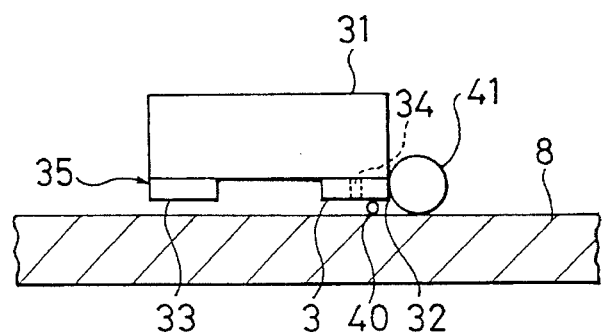

FIGS. 3a and 3b show a detailed structure of the magnetic head 1.

In FIGS. 3a and 3b, a magnetic head slider member 31 in the magnetic head 1 has a recessed portion in a central portion thereof in a longitudinal direction on a face opposite to the magnetic disk 8. Side rail members 32 and 33 are projected on both sides of this recessed portion.

The side rail member 32 is located on an outer circumferential side of the magnetic disk 8. A magnetic head core member 34 is formed in an end portion of the side rail member 32 in a rotational direction of the magnetic disk 8. A slanting face 35 is formed at an opposite end of the magnetic head slider member 31 to effectively obtain buoyancy caused by an air flow flowing along a surface of the magnetic disk 8.

Dust attached onto a recording face of the magnetic disk 8 can be removed therefrom as follows by using such a magnetic head slider member 31.

The side rail members 32 and 33 of the magnetic head slider member 31 are first located on the same radius on the recording face of the rotating magnetic disk 8 in a state in which a position of the magnetic head slider member 31 is fixed. Accordingly, the side rail members 32 and 33 draw loci TR1 and TR2 having a face shape shown in FIG. 4 with respect to the recording face. At this time, small dust 40 located in a space between the side rail members 32, 33 and the recording face of the magnetic disk 8 is removed from this space as shown in FIG. 3b.

Accordingly, the dust 40 attached onto the loci TR1 and TR2 can be removed when a certain time has passed in a fixed state of the magnetic head slider member 31.

For example, as shown in FIG. 3b, dust 41 having a size larger than a clearance between the side rail members 32, 33 and the recording face of the magnetic disk 8 is flied on a side face of the magnetic head slider member 31 when the magnetic head slider member 31 is reciprocated at a moving speed higher than a normal moving speed in the radial direction of the magnetic disk 8.

Figure 5A:
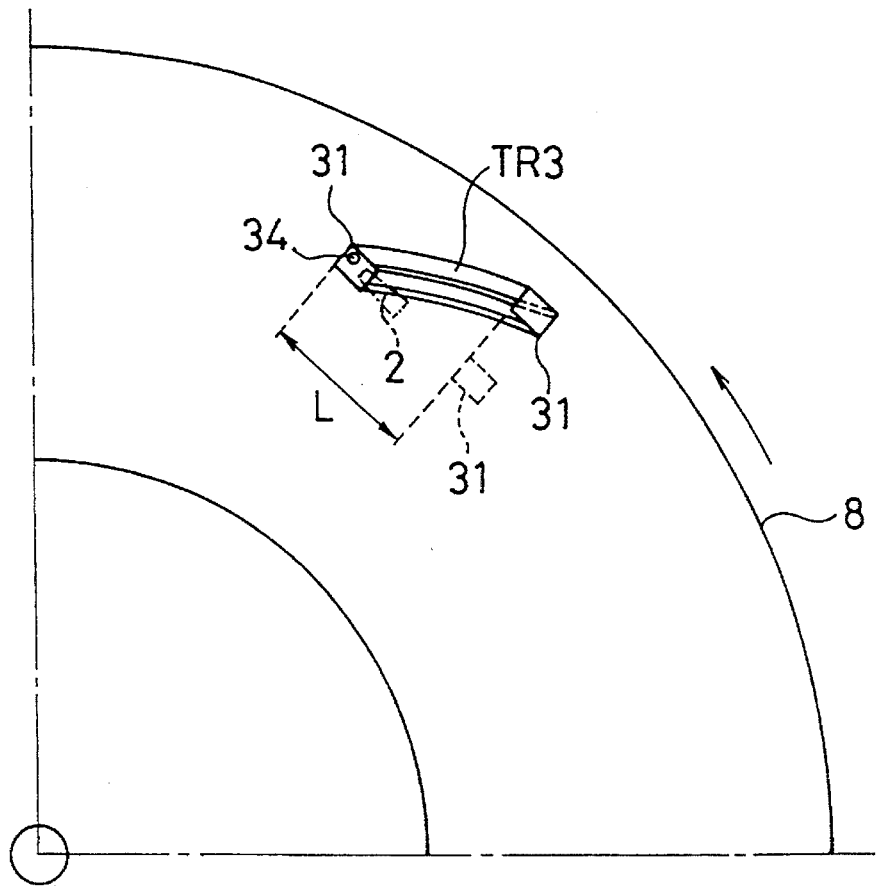
FIGS. 5a and 5b are schematic views for explaining another method for removing dust.

At this time, an air flow caused on a surface of the magnetic disk 8 flows from an inner circumference toward an outer circumference. Accordingly, as shown in FIG. 5a, when the magnetic head slider member 31 is moved in an outer circumferential direction of the magnetic disk 8, the dust 41 flied on the outer circumferential side face of the magnetic head slider member 31 is moved outward in the outer circumferential direction and is removed from the magnetic disk 8. In FIG. 5a, a distance L shows a moving distance of the magnetic head slider member 31 in the rotational direction of the magnetic disk 8 when the magnetic head slider member 31 is moved in a going direction as the outer circumferential direction in the reciprocating movement.

Figure 5B:
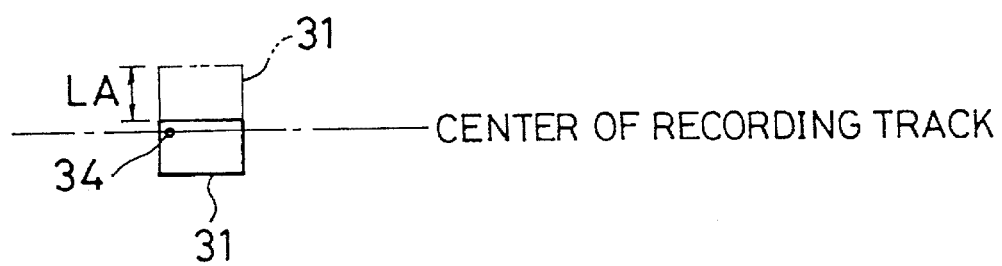

Namely, in this case, when the magnetic head slider member 31 is reciprocated at one time, a portion of the attached dust 41 included in a locus TR3 drawn by the outer circumferential side of the magnetic head slider member 31 on the recording face of the magnetic disk 8 is removed from the magnetic disk when the magnetic head slider member 31 is moved in the outer circumferential direction. As shown in FIG. 5b, at this time, a reciprocating width LA of the magnetic head slider member 31 in the radial direction of the magnetic disk 8 is preferably set to be equal to or greater than a size of the magnetic head slider member 31 on a shorter side thereof.

In the above structure, when commands for reproducing data are given from the host device to the control section 21, recorded data are reproduced in a sector unit and dust around this sector is removed from the recording face of the magnetic disk 8 when a data error is included in the reproduced data.

Figure 6:
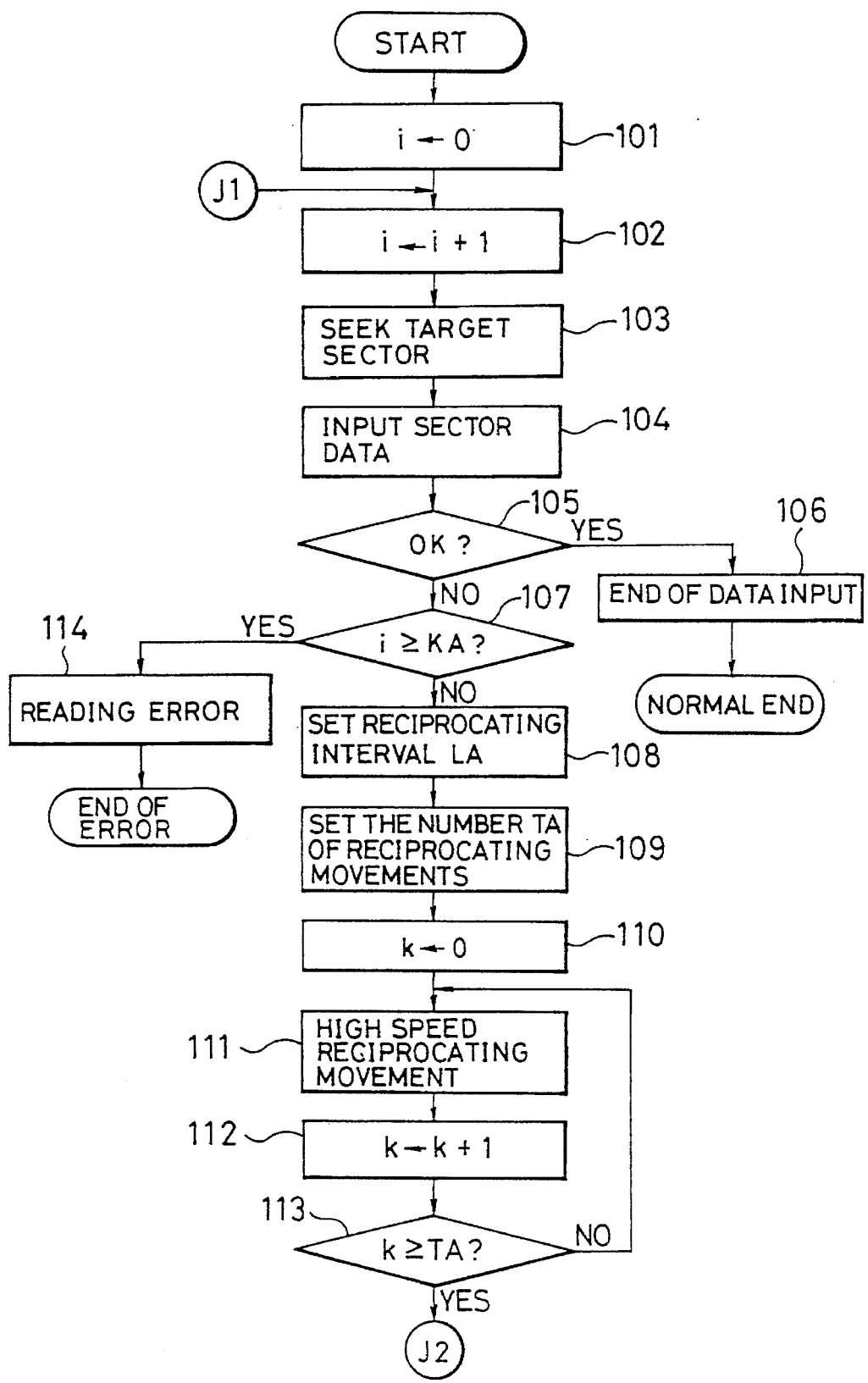
FIG. 6 is a flow chart showing a processing example of data at a reproducing time of the data.

Namely, as shown in FIG. 6, the counting value of a counter i for judging a reading error is initially set to zero in a processing step 101. The counting value of the counter i is then incremented in a processing step 102. A target sector designated by the host device is sought in a processing step 103. Recorded data in this target sector are inputted in a processing step 104.

In a judging step 105, it is judged whether or not the data recording reproducing circuit 23 detects a data error with respect to the inputted recorded data. When the judgment in the judging step 105 is YES, data are normally inputted from the target sector. Accordingly, the data recording reproducing circuit 23 transmits completion of the data input to the host device in a processing step 106. Thus, this processing step 106 is normally completed.

In contrast to this, when the judgment in the judging step 105 is NO, it is judged in a judging step 107 whether the counting value of the counter i is equal to or greater than a limit value KA indicative of the number of data recording trials. When the judgment in the judging step 107 is NO, a reciprocating interval LA for moving the magnetic head slider member 31 in the radial direction of the magnetic disk 8 is set in a processing step 108 to remove dust from the magnetic disk 8. Further, the number TA of reciprocating movements of the magnetic head slider member 31 is set in a processing step 109. For example, the reciprocating interval LA is set to a size of the magnetic head slider member 31 in a width direction thereof. The number TA is set to a value such as several ten for sufficiently removing dust from the magnetic disk by the magnetic head slider member 31.

The counting value of a counter k for controlling the number of reciprocating movements of the magnetic head slider member 31 is initially set to zero in a processing step 110. High speed reciprocating processing for reciprocating the magnetic head slider member 31 at a high speed is performed at one time in a processing step 111. The counting value of the counter k is incremented in a processing step 112. It is next judged in a judging step 113 whether the counting value of the counter k is equal to or greater than the number TA. When the judgment in the judging step 113 is NO, it is returned to the processing step 111 and the high speed reciprocating processing is again performed. In contrast to this, when the judgment in the judging step 113 is YES, it proceeds to the processing step 102 to again read the recorded data from the magnetic disk.

When the judgment in the judging step 107 is YES, no data error can be dissolved so that the reading error is transmitted to the host device in a processing step 114. Thus, this processing step 114 is completed.

Figure 7:
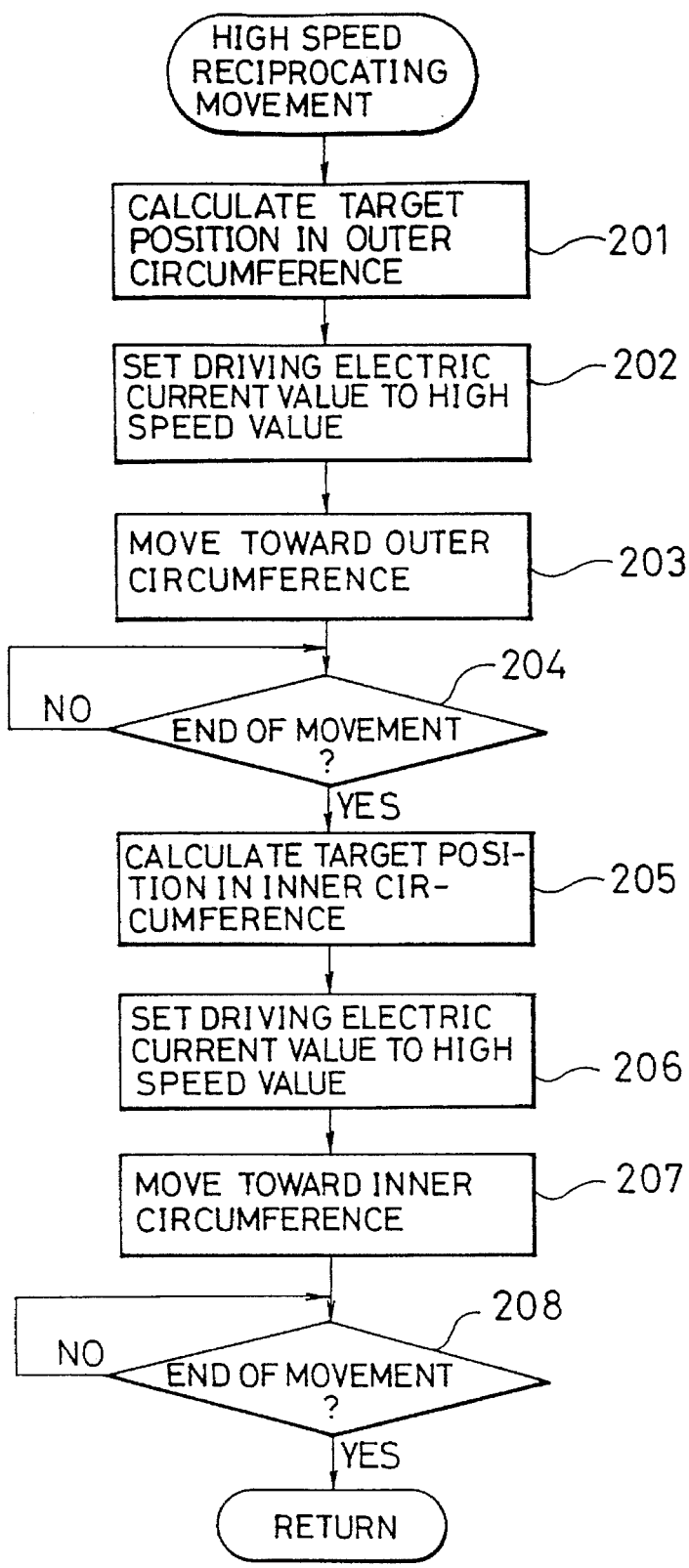
FIG. 7 is a flow chart showing one example of high speed reciprocating processing.

FIG. 7 shows one example of the high speed reciprocating processing.

In a first processing step 201 shown in FIG. 7, a target position of the magnetic head 1 in the outer circumferential direction of the magnetic disk is calculated from the present position of the magnetic head 1 by subtracting the set reciprocating interval LA from this present position. In a processing step 202, a command value of a driving electric current outputted to a VCM driving section 24 is set to a value provided at a high speed moving time. In a processing step 203, the command value of the driving electric current and a polarity value thereof are outputted to the VCM driving section 24 and the magnetic head 1 is moved in the outer circumferential direction in a state in which the polarity value of the driving electric current is set to a value corresponding to the outer circumferential direction.

In this state, the position of the magnetic head 1 is monitored and it is judged whether the magnetic head 1 is moved to the target position when the judgment in a judging step 204 is NO. When the magnetic head 1 is moved to the target position in the outer circumferential direction and the judgment in the judging step 204 is YES, the output of the command value with respect to the VCM driving section 24 is stopped.

In a processing step 205, a target position of the magnetic head 1 in the inner circumferential direction of the magnetic disk is calculated from the present position of the magnetic head 1 by adding the set reciprocating interval LA to this present position. In a processing step 206, a command value of a driving electric current outputted to the VCM driving section 24 is set to a value provided at the high speed moving time. In a processing step 207, the command value of the driving electric current and a polarity value thereof are outputted to the VCM driving section 24 and the magnetic head 1 is moved in the inner circumferential direction in a state in which the polarity value of the driving electric current is set to a value corresponding to the inner circumferential direction.

In this state, the position of the magnetic head 1 is monitored and it is judged whether the magnetic head 1 is moved to the target position when the judgment in a judging step 208 is NO. When the magnetic head 1 is moved to the target position in the inner circumferential direction and the judgment in the judging step 208 is YES, the output of the command value with respect to the VCM driving section 24 is stopped.

Thus, in this embodiment, when a data error is detected at a reproducing time of data, the magnetic head 1 and the magnetic head slider member 31 are reciprocated at a high speed. Thus, dust is removed from a peripheral portion of a recording track including a detecting sector of the data error. Accordingly, when the data error is caused by the dust, the data error is dissolved and reproduced data can be normally obtained.

In the above embodiment, the dust attached to the recording face of the magnetic disk 8 is removed therefrom by reciprocating the magnetic head slider member 31 at a high speed in the radial direction of the magnetic disk 8. In this case, the dust can be removed from the recording face of the magnetic disk only when the magnetic head slider member 31 is moved in the outer circumferential direction of the magnetic disk 8. Therefore, no dust can be removed from the recording face of the magnetic disk in a portion thereof through which no magnetic head slider member 31 passes in its movement in the outer circumferential direction.

In the above embodiment, the magnetic head slider member 31 is repeatedly reciprocated while the magnetic disk 8 is rotated plural times. Accordingly, the dust can be sufficiently removed from the recording face of the magnetic disk in all the peripheral portion of a recording track including a sector in which the data error is caused.

A method for improving dust removing effects in comparison with the above embodiment will be described in the next embodiment of the present invention.

Figure 8:
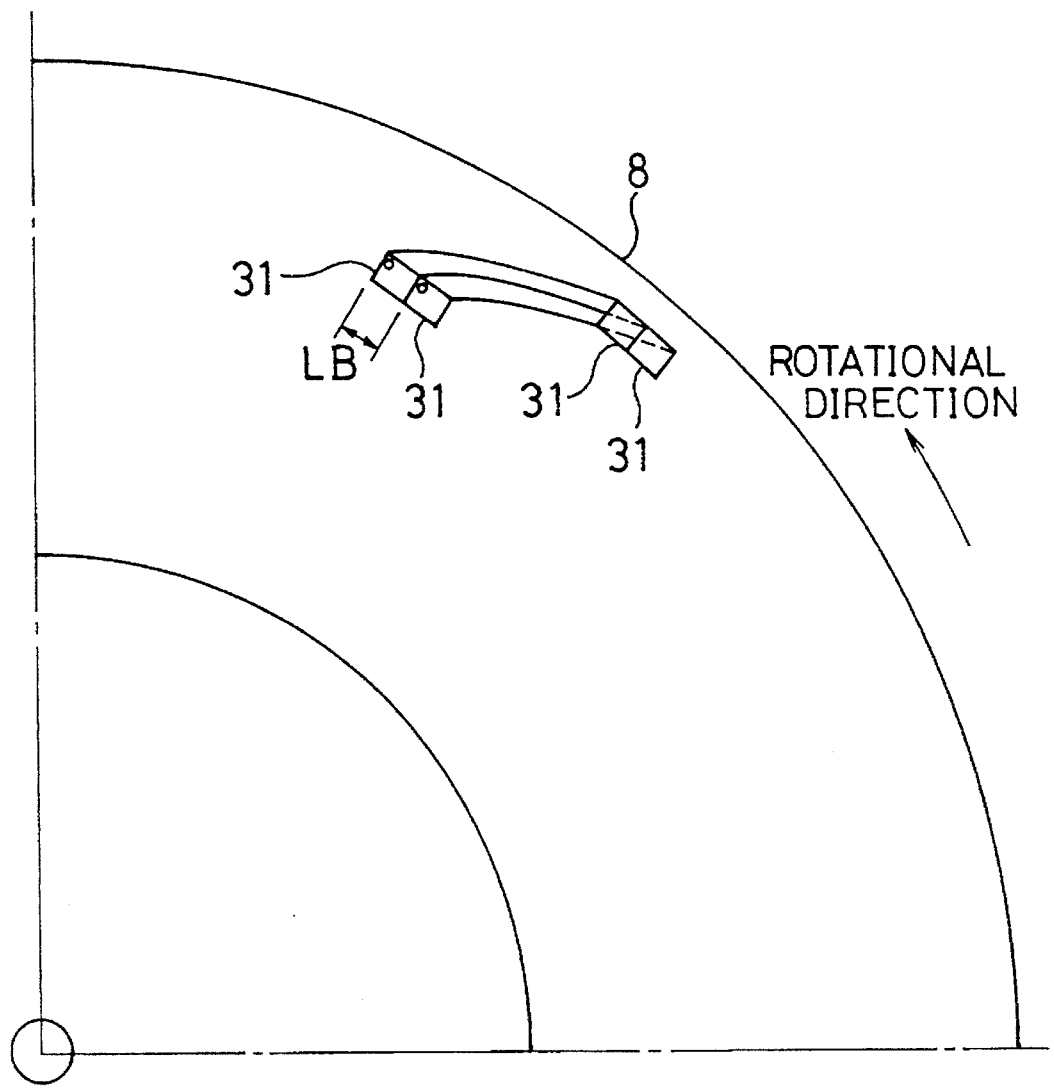
FIG. 8 is a schematic view for explaining another method for removing dust.

In this embodiment, as shown in FIG. 8, a reciprocating starting position of the magnetic head slider member 31 is shifted by a size LB of the magnetic head slider member 31 corresponding to a rotational direction of the magnetic disk. Thus, passing portions of the magnetic head slider member 31 can be continuously connected to each other when the magnetic head slider member 31 is moved in the outer circumferential direction. Accordingly, dust can be effectively removed from a peripheral portion of a recording track including a sector in which a data error is caused.

Figure 9:
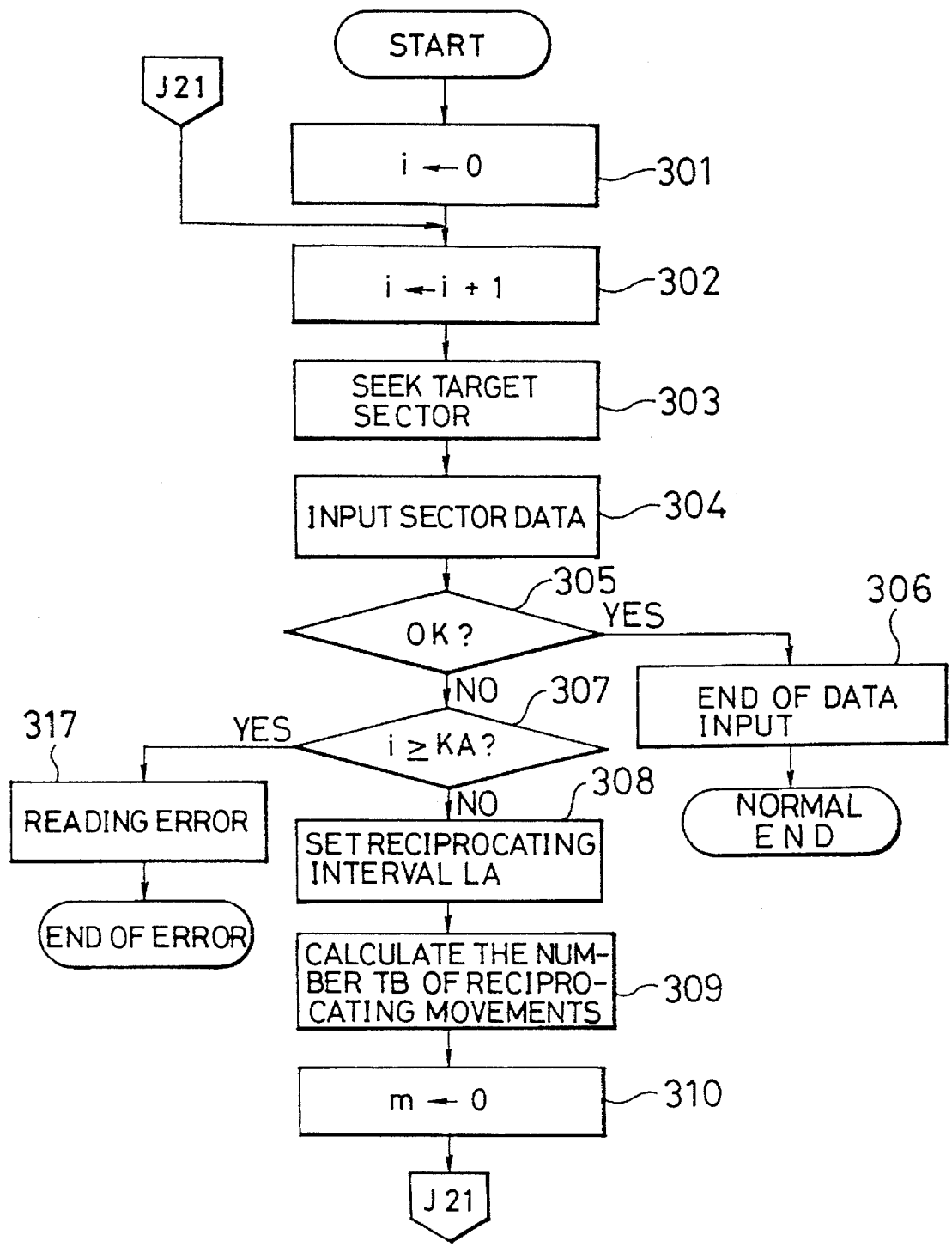
FIG. 9 is a flow chart showing a portion of another processing example at the data reproducing time.
Figure 10:
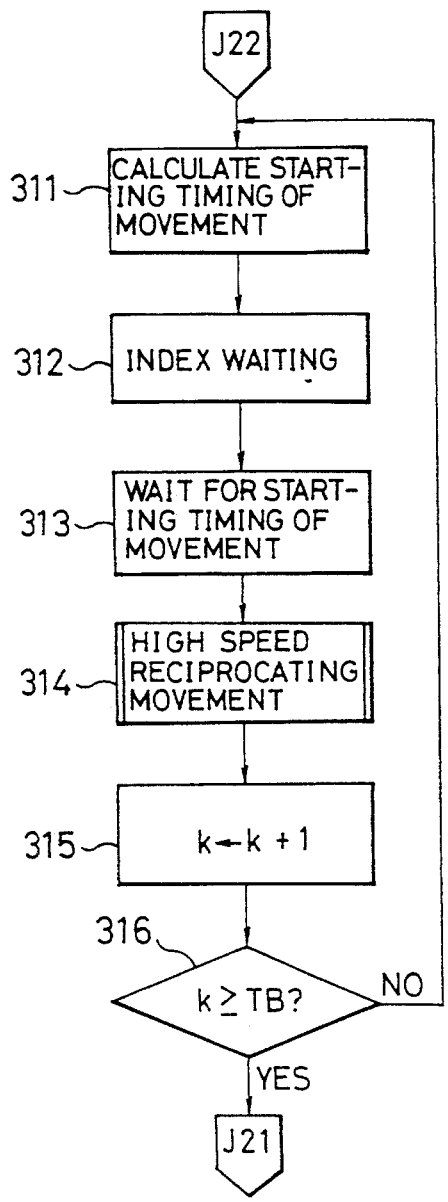
FIG. 10 is a flow chart showing another portion of another processing example at the data reproducing time.

FIGS. 9 and 10 show a processing example of data at a data reproducing time in accordance with another embodiment of the present invention. This processing is performed in one sector unit.

In a processing step 301 shown in FIG. 9, the counting value of a counter i for judging a reading error is initially set to zero. The counting value of the counter i is incremented in a processing step 302. A target sector designated by the host device is sought in a processing step 303. Recorded data in this target sector are inputted in a processing step 304.

In a judging step 305, it is judged whether or not the data recording reproducing circuit 23 detects a data error with respect to the inputted recorded data. When the judgment in the judging step 305 is YES, data are normally inputted from the target sector. Accordingly, the data recording reproducing circuit 23 transmits completion of the data input to the host device in a processing step 306. Thus, this processing step 306 is normally completed.

In contrast to this, when the judgment in the judging step 305 is NO, it is judged in a judging step 307 whether the counting value of the counter i is equal to or greater than a limit value KA indicative of the number of data recording trials. When the judgment in the judging step 307 is NO, a reciprocating interval LA for moving the magnetic head slider member 31 in the radial direction of the magnetic disk 8 is set in a processing step 308 to remove dust from the magnetic disk 8. Further, the number TB of reciprocating movements of the magnetic head slider member 31 is set in a processing step 309. For example, the number TB is set to a value corresponding to a position of the magnetic head 1 in the radial direction of the magnetic disk 8. Namely, the number TB is set to a value provided by dividing a circle of the magnetic disk 8 providing the position of the magnetic head 1 by the size LB of the magnetic head slider member 31 corresponding to the circumferential direction of the magnetic disk 8.

Next, the counting value of a counter m for controlling the number of reciprocating movements of the magnetic head slider member 31 is initially set to zero in a processing step 310. In a processing step 311, starting timing of the high speed reciprocating movement of the magnetic head slider member 31 is calculated in accordance with the counting value of the counter m. In a processing step 312, the magnetic head slider member 31 is in a standby state until an index showing a rotating reference position of the magnetic disk 8 is detected. When this index is detected, the magnetic head slider member 31 is also in a standby state in a processing step 313 until the starting timing of the reciprocating movement calculated in the processing step 311. High speed reciprocating processing for reciprocating the magnetic head slider member 31 at a high speed is then performed at one time in a processing step 314.

The counting value of the counter m is next incremented in a processing step 315. It is then judged in a judging step 316 whether the counting value of the counter m is equal to or greater than the number TB. When the judgment in the judging step 316 is NO, it is returned to the processing step 311 and the high speed reciprocating processing is again performed. In contrast to this, when the judgment in the judging step 315 is YES, it proceeds to the processing step 302 to again read the recorded data from the magnetic disk.

When the judgment in the judging step 307 is YES, no data error can be dissolved so that the reading error is transmitted to the host device in a processing step 317. Thus, this processing step 317 is completed.

Figure 12:
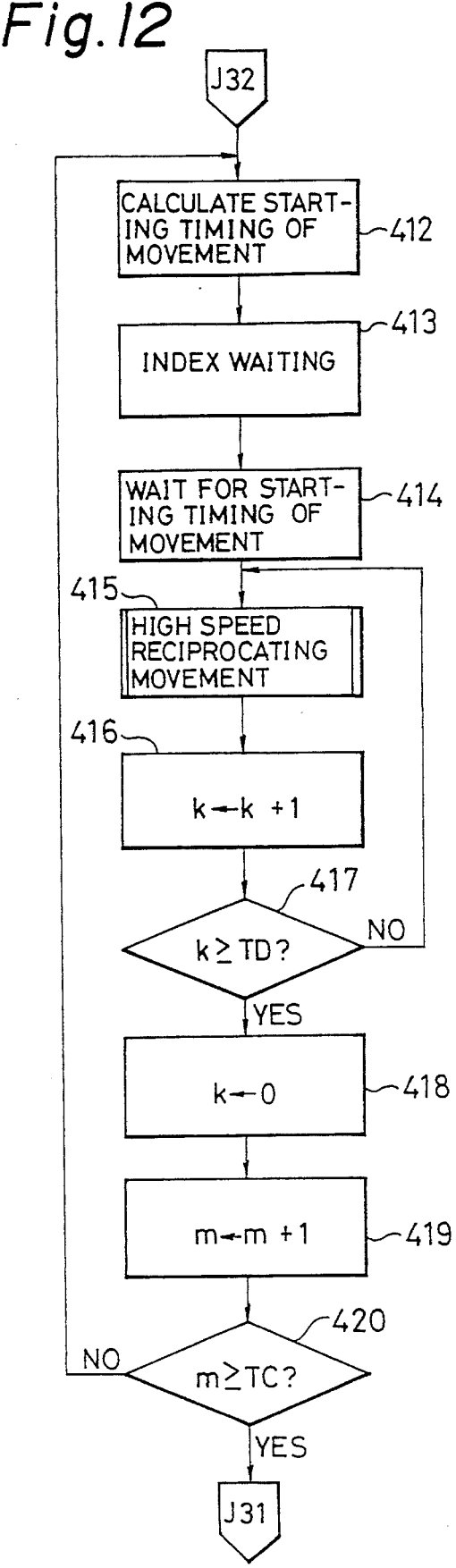
FIG. 12 is a flow chart showing another portion of another processing example at the data reproducing time.
Figure 11:
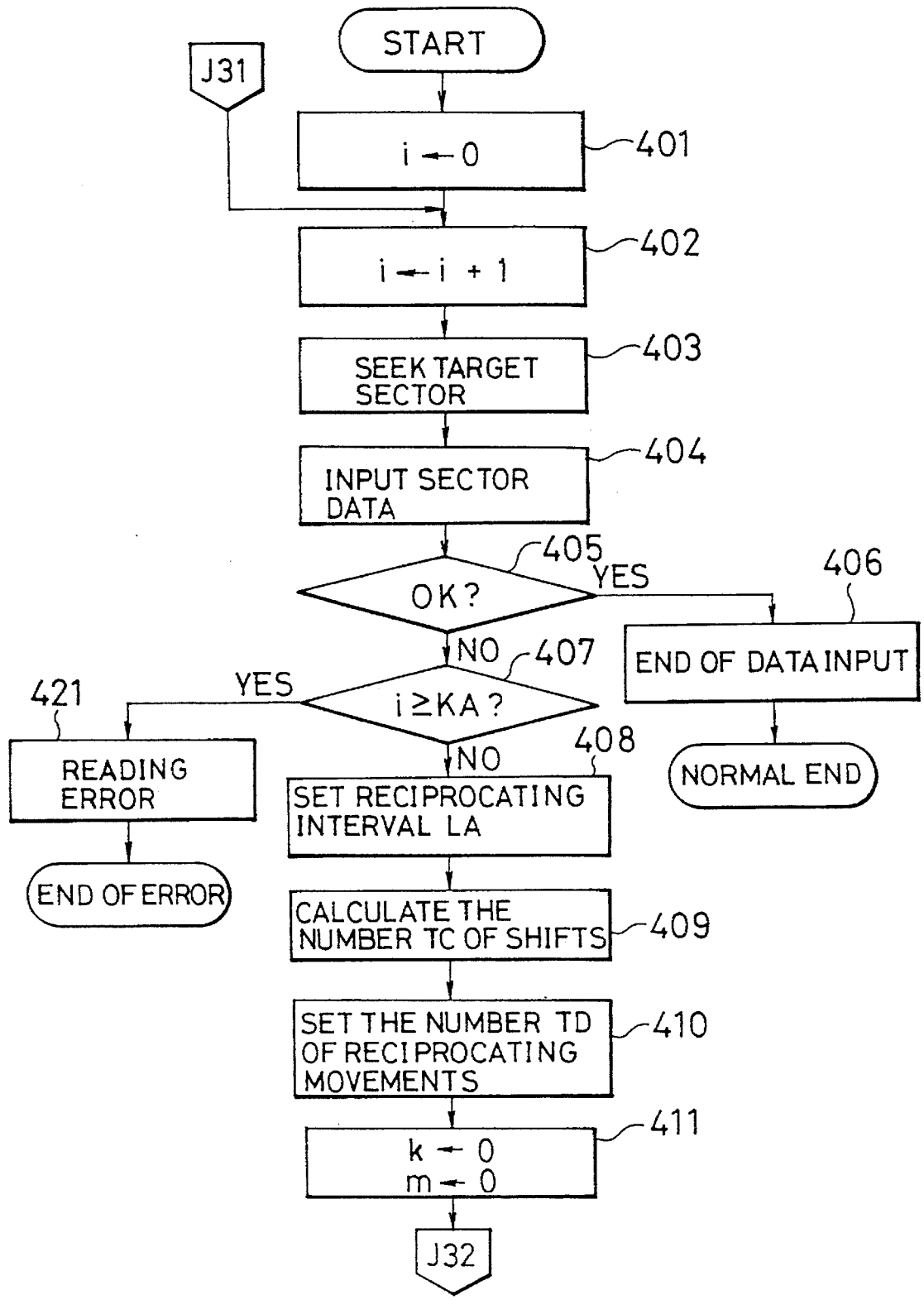
FIG. 11 is a flow chart showing a portion of another processing example at the data reproducing time.

FIGS. 11 and 12 show a processing example of data at a data reproducing time in accordance with another embodiment of the present invention.

In this embodiment, the magnetic head slider member 31 is reciprocated a predetermined number of times at a high speed. Further, the starting timing of a first reciprocating operation of the magnetic head slider member 31 is shifted by the size LB of the magnetic head slider member 31 corresponding to the rotational direction of the magnetic disk. The predetermined number (e.g., the number of shifts) of high speed reciprocating movements corresponds to a value provided by dividing the moving distance L of the magnetic head slider member 31 in the radial direction of the magnetic disk 8 by the size LB when the magnetic head slider member 31 is reciprocated.

First, the counting value of a counter i for judging a reading error is initially set to zero in a processing step 401. The counting value of the counter i is then incremented in a processing step 402. A target sector designated by the host device is sought in a processing step 403. Recorded data in this target sector are inputted in a processing step 404.

In a judging step 405, it is judged whether or not the data recording reproducing circuit 23 detects a data error with respect to the inputted recorded data. When the judgment in the judging step 405 is YES, data are normally inputted from the target sector. Accordingly, the data recording reproducing circuit 23 transmits completion of the data input to the host device in a processing step 406. Thus, this processing step 406 is normally completed.

In contrast to this, when the judgment in the judging step 405 is NO, it is judged in a judging step 407 whether the counting value of the counter i is equal to or greater than a limit value KA indicative of the number of data recording trials. When the judgment in the judging step 407 is NO, a reciprocating interval LA for moving the magnetic head slider member 31 in the radial direction of the magnetic disk 8 is set in a processing step 408 to remove dust from the magnetic disk 8. Further, the number TC of shifts of the magnetic head slider member 31 is calculated as mentioned above in a processing step 409. The number TD of reciprocating movements of the magnetic head slider member 31 is set in a processing step 410.

The counting value of a counter k for controlling the number of reciprocating movements of the magnetic head slider member 31 and the counting value of a counter m for controlling the number of shifts of the magnetic head slider member 31 are respectively initially set to zero in a processing step 411. Starting timing of the high speed reciprocating movement of the magnetic head slider member 31 is calculated in a processing step 412 in accordance with the counting value of the counter m. In a processing step 413, the magnetic head slider member 31 is in a standby state until an index showing a rotating reference position of the magnetic disk 8 is detected. When this index is detected, the magnetic head slider member 31 is also in a standby state in a processing step 414 until the starting timing of the reciprocating movement calculated in the processing step 412.

When the starting timing of the reciprocating movement is detected, high speed reciprocating processing for reciprocating the magnetic head slider member 31 at a high speed is performed at one time in a processing step 415. The counting value of the counter k is incremented in a processing step 416. It is then judged in a judging step 417 whether the counting value of the counter k is equal to or greater than the number TD. When the judgment in the judging step 417 is NO, it is returned to the processing step 415 and the high speed reciprocating processing is again performed.

In contrast to this, when the judgment in the judging step 417 is YES, the high speed reciprocating operation of the magnetic head slider member 31 is completed at a certain starting timing of the reciprocating movement so that the counting value of the counter k is initially set to zero in a processing step 418. The counting value of the counter m is incremented in a processing step 419. It is then judged in a judging step 420 whether the counting value of the counter m is equal to or greater than the number TC. When the judgment in the judging step 420 is NO, it is returned to the processing step 412 and the high speed reciprocating operation of the magnetic head slider member 31 is performed at the next starting timing of the reciprocating movement. In contrast to this, when the judgment in the judging step 420 is YES, it proceeds to the processing step 402 to again read the recorded data from the magnetic disk.

When the judgment in the judging step 407 is YES, no data error can be dissolved so that the reading error is transmitted to the host device in a processing step 421. Thus, this processing step 421 is completed.

To remove dust from a surface of the magnetic disk 8 providing the position of a detecting sector in which a data error is included in reproduced data, the high speed reciprocating operation of the magnetic head slider member 31 is preferably controlled such that the magnetic head slider member 31 passes through a position including this sector.

Figure 13:
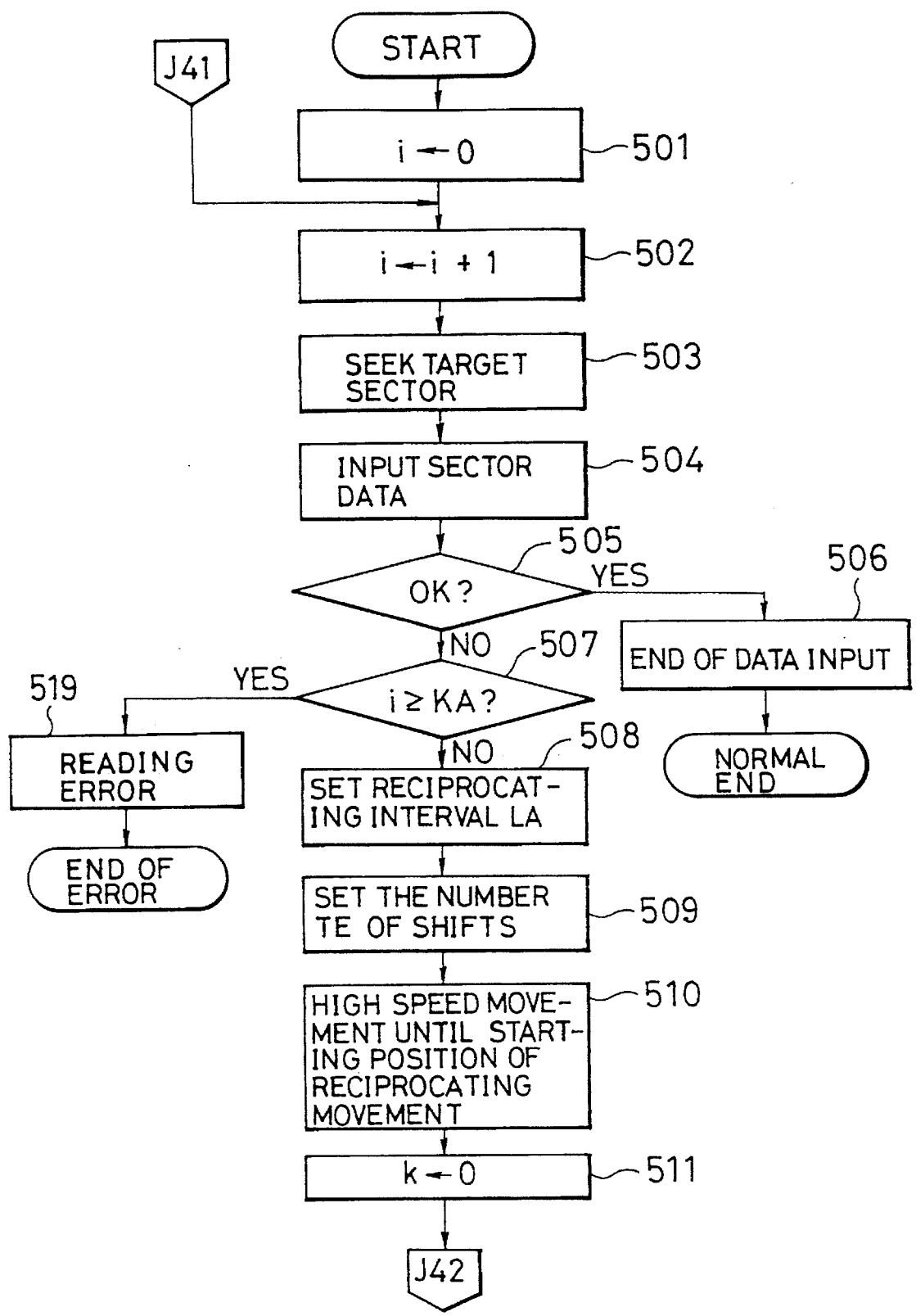
FIG. 13 is a flow chart showing a portion of another processing example at the data reproducing time.
Figure 14:
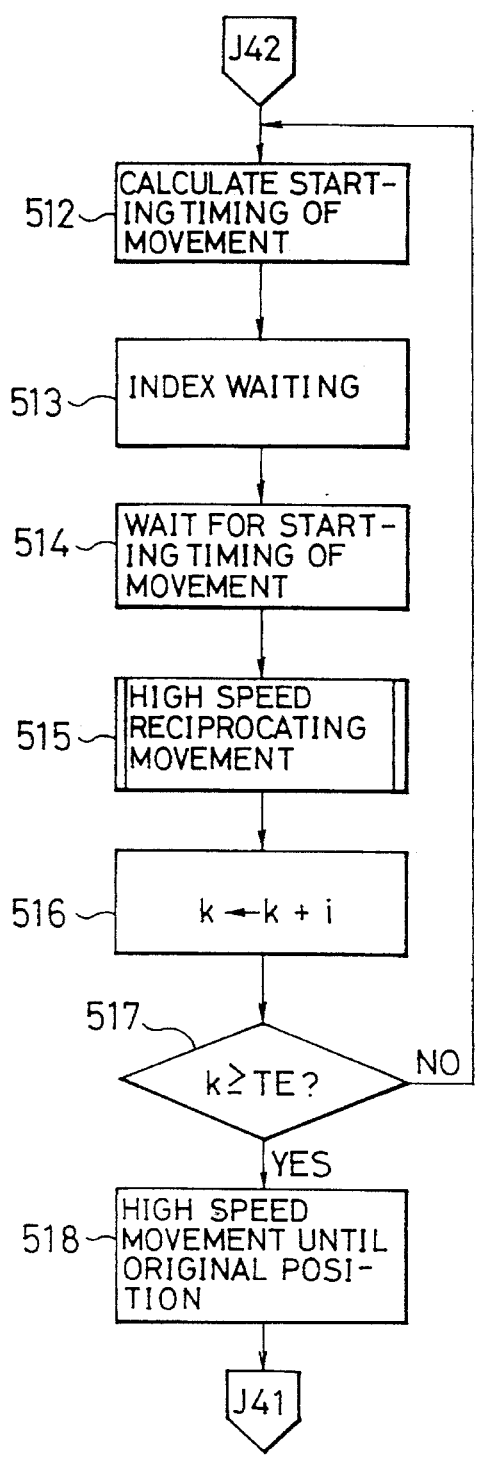
FIG. 14 is a flow chart showing another portion of another processing example at the data reproducing time.

FIGS. 13 and 14 show a processing example of data at a data reproducing time in accordance with another embodiment of the present invention.

In this embodiment, starting timing of the high speed reciprocating movement is sequentially changed such that the magnetic head slider member 31 is reciprocated at one time at a high speed per one rotation of the magnetic disk 8 and passes through a region of the magnetic disk 8 from a head of the detecting sector of the data error to an end thereof. Further, a starting position of the high speed reciprocating operation is shifted by ½ times a reciprocating range in the inner circumferential direction of the magnetic disk 8 such that the high speed reciprocating operation is performed around a recording track as a center at the same distance in the radial direction of the magnetic disk 8.

In FIG. 13, first, the counting value of a counter i for judging a reading error is initially set to zero in a processing step 501. The counting value of the counter i is then incremented in a processing step 502. A target sector designated by the host device is sought in a processing step 503. Recorded data in this target sector are inputted in a processing step 504.

In a judging step 505, it is judged whether or not the data recording reproducing circuit 23 detects a data error with respect to the inputted recorded data. When the judgment in the judging step 505 is YES, data are normally inputted from the target sector. Accordingly, the data recording reproducing circuit 23 transmits completion of the data input to the host device in a processing step 506. Thus, this processing step 506 is normally completed.

In contrast to this, when the judgment in the judging step 505 is NO, it is judged in a judging step 507 whether the counting value of the counter i is equal to or greater than a limit value KA indicative of the number of data recording trials. When the judgment in the judging step 507 is NO, a reciprocating interval LA for moving the magnetic head slider member 31 in the radial direction of the magnetic disk 8 is set in a processing step 508 to remove dust from the magnetic disk 8. Further, the number TE of high speed reciprocating operations of the magnetic head slider member 31 as the number of shifts is set in a processing step 509.

In a processing step 510, the magnetic head slider member 31 is moved at a high speed until the starting position of a high speed reciprocating operation in the radial direction of the magnetic disk 8. In this case, the magnetic head slider member 31 is moved in the inner circumferential direction. The counting value of a counter k for controlling the number of high speed reciprocating operations of the magnetic head slider member 31 is initially set to zero in a processing step 511.

In a processing step 512, starting timing of the high speed reciprocating movement of the magnetic head slider member 31 is calculated in accordance with a value which is provided by adding the counting value of the counter k multiplied by the size LB of the magnetic head slider member 31 to a distance from an index of the error sector at that time. In a processing step 513, the magnetic head slider member 31 is in a standby state until the index showing a rotating reference position of the magnetic disk 8 is detected. When this index is detected, the magnetic head slider member 31 is also in a standby state in a processing step 514 until the starting timing of the reciprocating movement calculated in the processing step 512. High speed reciprocating processing for reciprocating the magnetic head slider member 31 at a high speed is performed at one time in a processing step 515.

The counting value of the counter k is incremented in a processing step 516. It is then judged in a judging step 517 whether the counting value of the counter k is equal to or greater than the number TE. When the judgment in the judging step 517 is NO, it is returned to the processing step 512 and the high speed reciprocating processing is again performed. In contrast to this, when the judgment in the judging step 517 is YES, the magnetic head slider member 31 is moved at a high speed to the original position. Namely, the magnetic head slider member 31 is moved in the outer circumferential direction in a processing step 518. Thereafter, it proceeds to the processing step 502 to again read the recorded data from the magnetic disk.

When the judgment in the judging step 507 is YES, no data error can be dissolved so that the reading error is transmitted to the host device in a processing step 519. Thus, this processing step 519 is completed.

Figure 15:
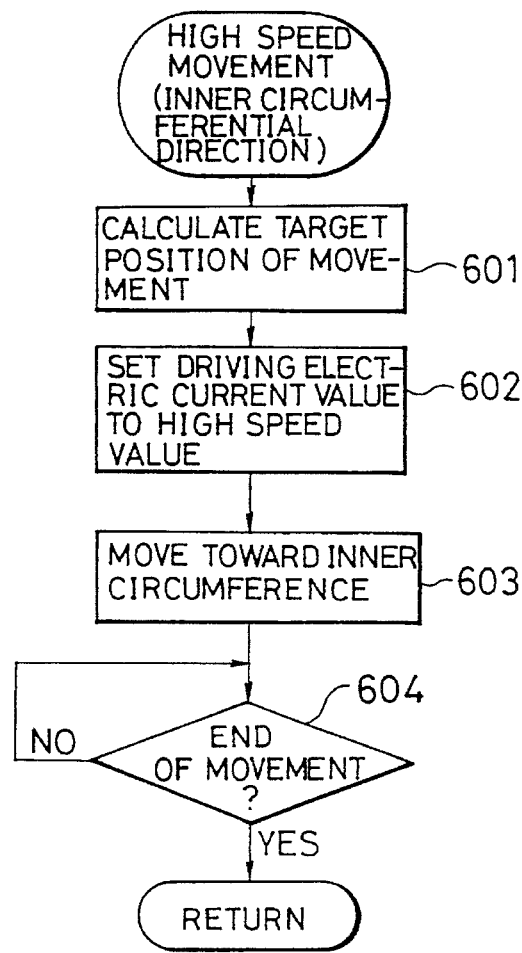
FIG. 15 is a flow chart showing one example of high speed moving processing in an inner circumferential direction.

FIG. 15 shows one example of the high speed reciprocating processing in the inner circumferential direction in the processing step 510.

In a first processing step 601, a target position of the magnetic head 1 in the inner circumferential direction of the magnetic disk is calculated from the present position of the magnetic head 1 by adding a value ½ times the set reciprocating interval LA to this present position. In a processing step 602, a command value of a driving electric current outputted to the VCM driving section 24 is set to a value provided at a high speed moving time. In a processing step 603, the command value of the driving electric current and a polarity value thereof are outputted to the VCM driving section 24 and the magnetic head 1 is moved in the inner circumferential direction in a state in which the polarity value of the driving electric current is set to a value corresponding to the inner circumferential direction.

In this state, the position of the magnetic head 1 is monitored and it is judged whether the magnetic head 1 is moved to the target position when the judgment in a judging step 604 is NO. When the magnetic head 1 is moved to the target position in the inner circumferential direction and the judgment in the judging step 604 is YES, the output of the command value with respect to the VCM driving section 24 is stopped.

Figure 16:
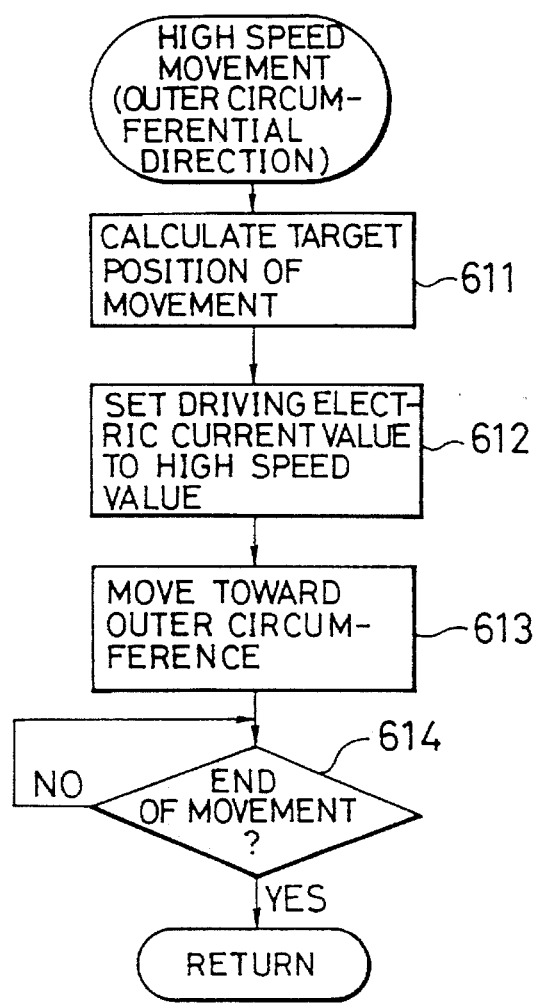
FIG. 16 is a flow chart showing one example of the high speed moving processing in an outer circumferential direction.

FIG. 16 shows one example of the high speed reciprocating processing in the outer circumferential direction in the processing step 518.

In a first processing step 611, a target position of the magnetic head 1 in the outer circumferential direction of the magnetic disk is calculated from the present position of the magnetic head 1 by subtracting a value ½ times the set reciprocating interval LA from this present position. In a processing step 612, a command value of a driving electric current output ted to the VCM driving section 24 is set to a value provided at a high speed moving time. In a processing step 613, the command value of the driving electric current and a polarity value thereof are outputted to the VCM driving section 24 and the magnetic head 1 is moved in the outer circumferential direction in a state in which the polarity value of the driving electric current is set to a value corresponding to the outer circumferential direction.

In this state, the position of the magnetic head 1 is monitored and it is judged whether the magnetic head 1 is moved to the target position when the judgment in a judging step 614 is NO. When the magnetic head 1 is moved to the target position in the outer circumferential direction and the judgment in the judging step 614 is YES, the output of the command value with respect to the VCM driving section 24 is stopped.

Figure 17:
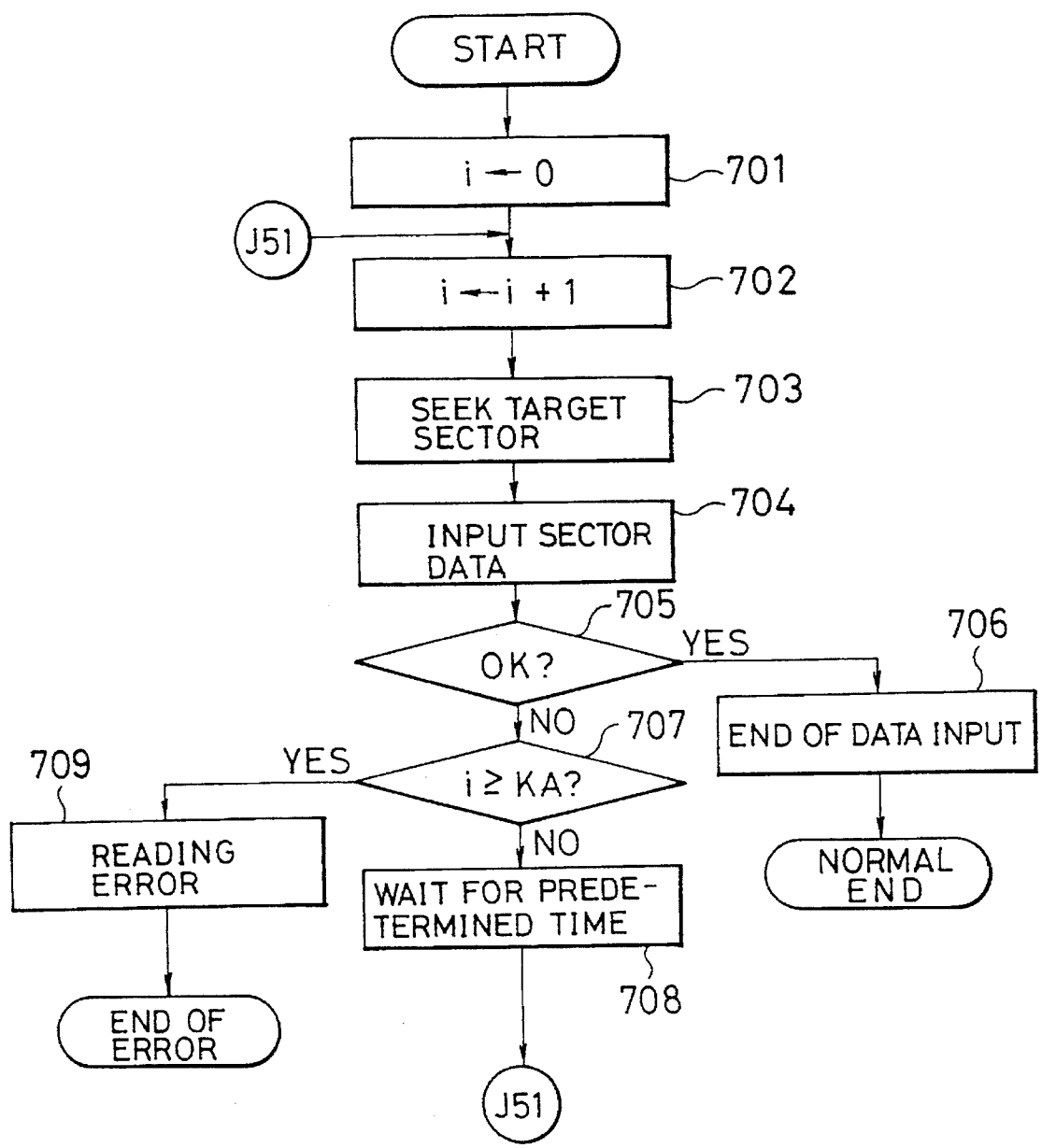
FIG. 17 is a flow chart showing another processing example at the data reproducing time.

FIG. 17 shows a processing example of data at a data reproducing time in accordance with another embodiment of the present invention.

In this embodiment, when a data error is detected, the magnetic head slider member 31 is in a standby state until a constant time has passed while a position of the magnetic head slider member 31 in the radial direction of the magnetic disk 8 is held. Thereafter, a reproducing operation is again performed.

In this case, as shown in FIG. 4, the side rail member 32 of the magnetic head slider member 31 is moved by trace on a recording track, it is possible to remove fine dust entering a clearance between the magnetic disk 8 and the side rail member 32.

As shown in FIG. 17, the counting value of a counter i for judging a reading, error is initially set to zero in a processing step 701. The counting value of the counter i is then incremented in a processing step 702. A target sector designated by the host device is sought in a processing step 703. Recorded data in this target sector are inputted in a processing step 704.

In a judging step 705, it is judged whether or not the data recording reproducing circuit 23 detects a data error with respect to the inputted recorded data. When the judgment in the judging step 705 is YES, data are normally inputted from the target sector. Accordingly, the data recording reproducing circuit 23 transmits completion of the data input to the host device in a processing step 706. Thus, this processing step 706 is normally completed.

In contrast to this, when the judgment in the judging step 705 is NO, it is judged in a judging step 707 whether the counting value of the counter i is equal to or greater than a limit value KA indicative of the number of data recording trials. When the judgment in the judging step 707 is NO, the present state of the magnetic disk unit is held for a predetermined time in a processing step 708 to remove dust from the magnetic disk 8. It is then returned to the processing step 702 and the data reproducing operation is again performed.

When the judgment in the judging step 707 is YES, no data error can be dissolved so that the reading error is transmitted to the host device in a processing step 709. Thus, this processing step 709 is completed.

Figure 18A:
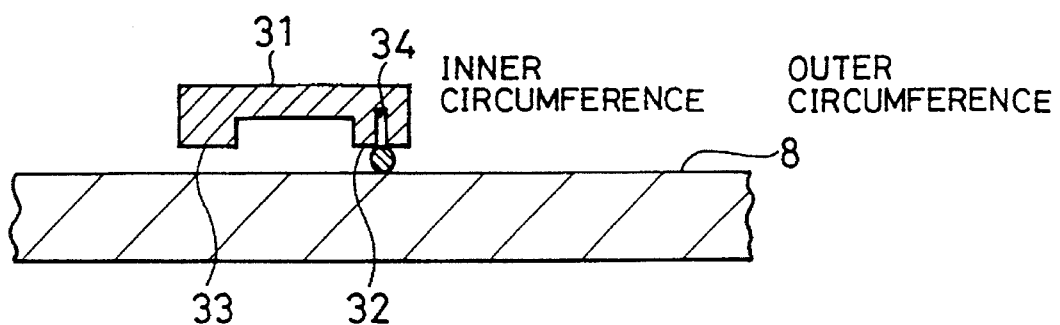
FIGS. 18a and 18b are explanatory views for explaining another example in which dust is removed from a magnetic disk.
Figure 18B:
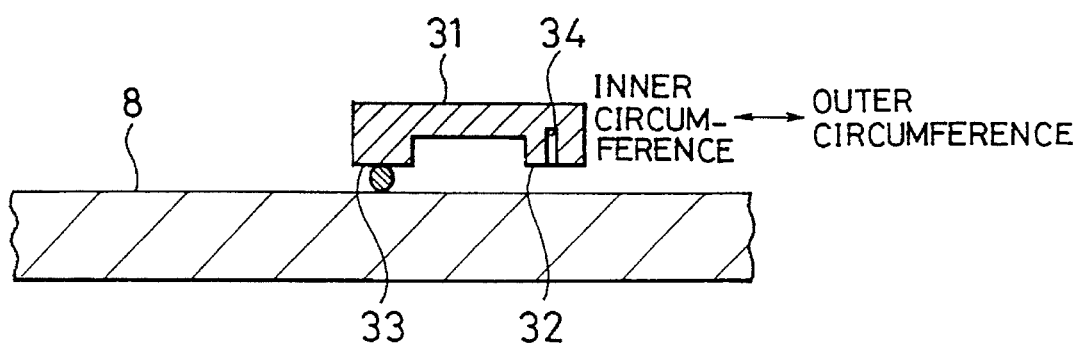

In this embodiment, a recording track having a possibility of the attachment of dust is traced by the side rail member 32 having a magnetic head core member 34 to remove the dust from the recording track. Accordingly, there is a fear that the magnetic head core member 34 is damaged. Therefore, as shown in FIGS. 18a and 18b, the magnetic head slider member 31 is preferably moved by a distance corresponding to a clearance between the side rail members 32 and 33 in the outer circumferential direction such that the side rail member 33 having no magnetic head core member 34 is located on the recording track including a detecting sector of the data error.

Figure 19:
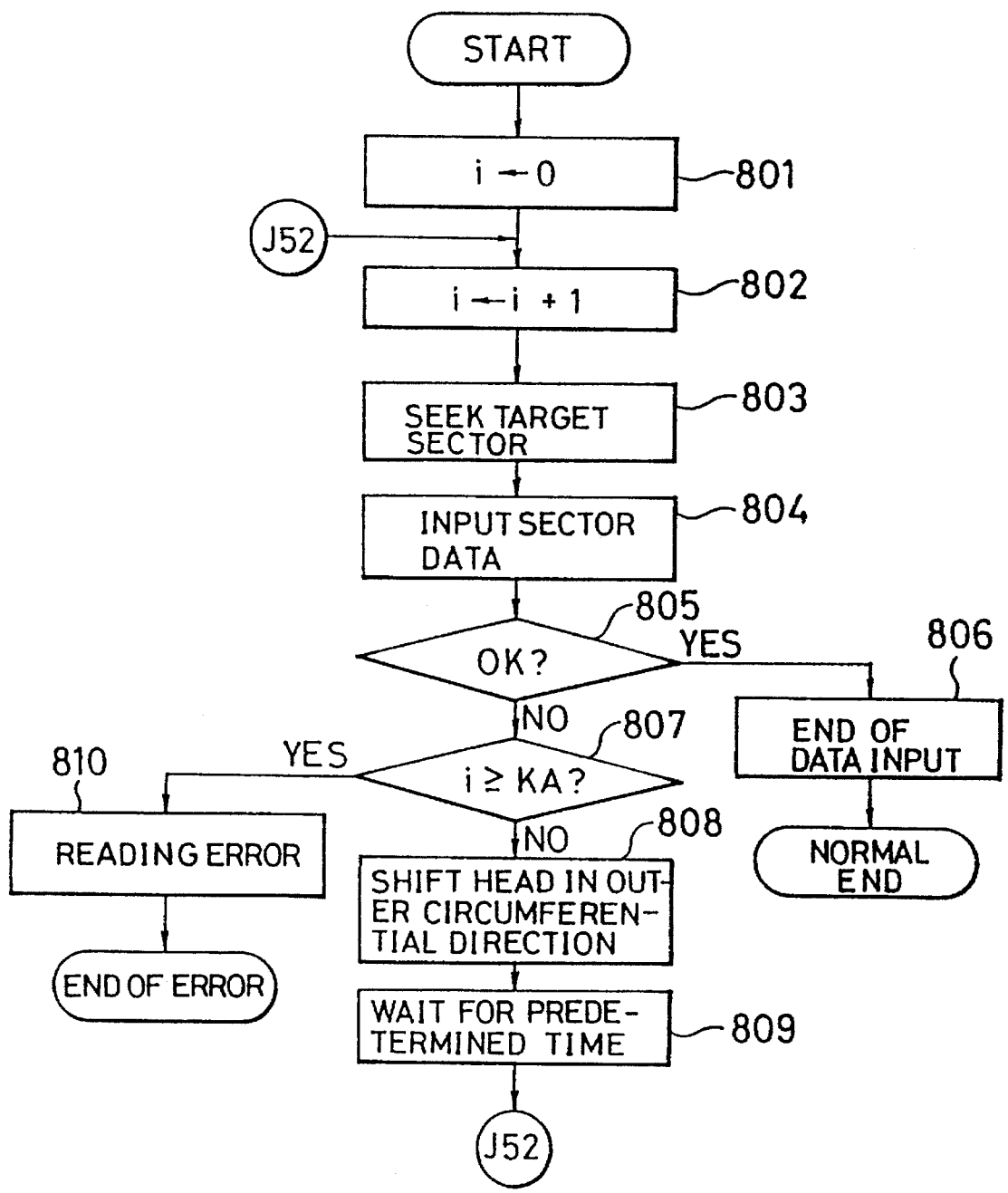
FIG. 19 is a flow chart showing another processing example at the data reproducing time.

FIG. 19 shows a processing example of data at a data reproducing time in such an embodiment.

In FIG. 19, the counting value of a counter i for judging a reading error is initially set to zero in a processing step 801. The counting value of the counter i is then incremented in a processing step 802. A target sector designated by the host device is sought in a processing step 803. Recorded data in this target sector are inputted in a processing step 804.

In a judging step 805, it is judged whether or not the data recording reproducing circuit 23 detects a data error with respect to the inputted recorded data. When the judgment in the judging step 805 is YES, data are normally inputted from the target sector. Accordingly, the data recording reproducing circuit 23 transmits completion of the data input to the host device in a processing step 806. Thus, this processing step 806 is normally completed.

In contrast to this, when the judgment in the judging step 805 is NO, it is judged in a judging step 807 whether the counting value of the counter i is equal to or greater than a limit value KA indicative of the number of data recording trials. When the judgment in the judging step 807 is NO, the magnetic head slider member 31 is moved in a processing step 808 by a distance corresponding to a clearance between the side rail members 32 and 33 in the outer circumferential direction. Thereafter, this state of the magnetic head slider member 31 is held for a predetermined time in a processing step 809 to remove dust from the magnetic disk 8. It is then returned to the processing step 802 and the data reproducing operation is again performed.

When the judgment in the judging step 807 is YES, no data error can be dissolved so that the reading error is transmitted to the host device in a processing step 810. Thus, this processing step 810 is completed.

Figure 21:
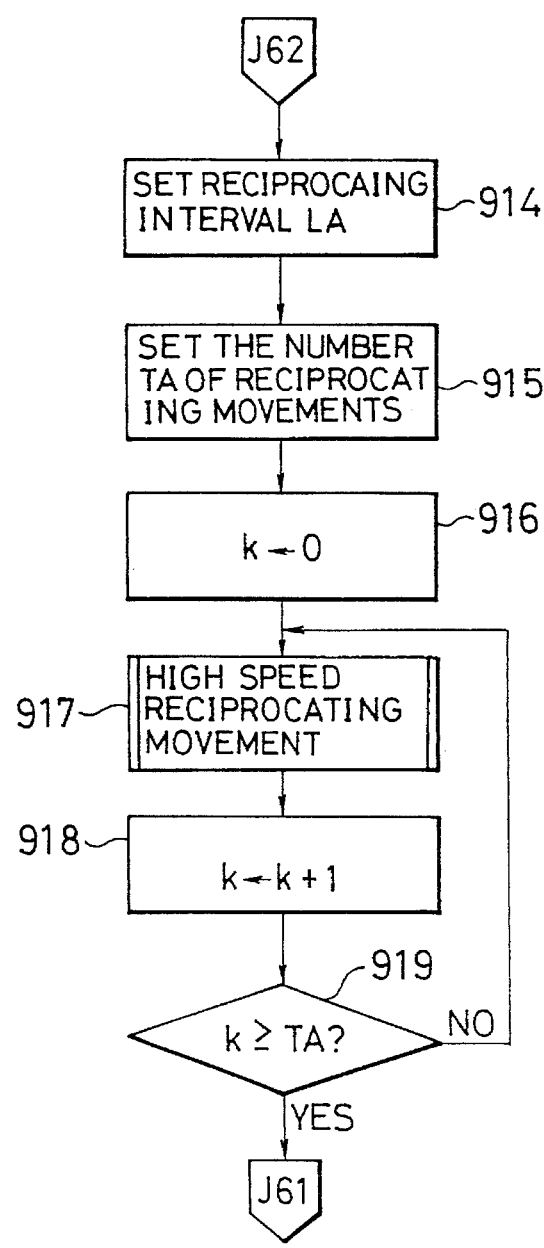
FIG. 21 is a flow chart showing another portion of another processing example at the data reproducing time.
Figure 20:
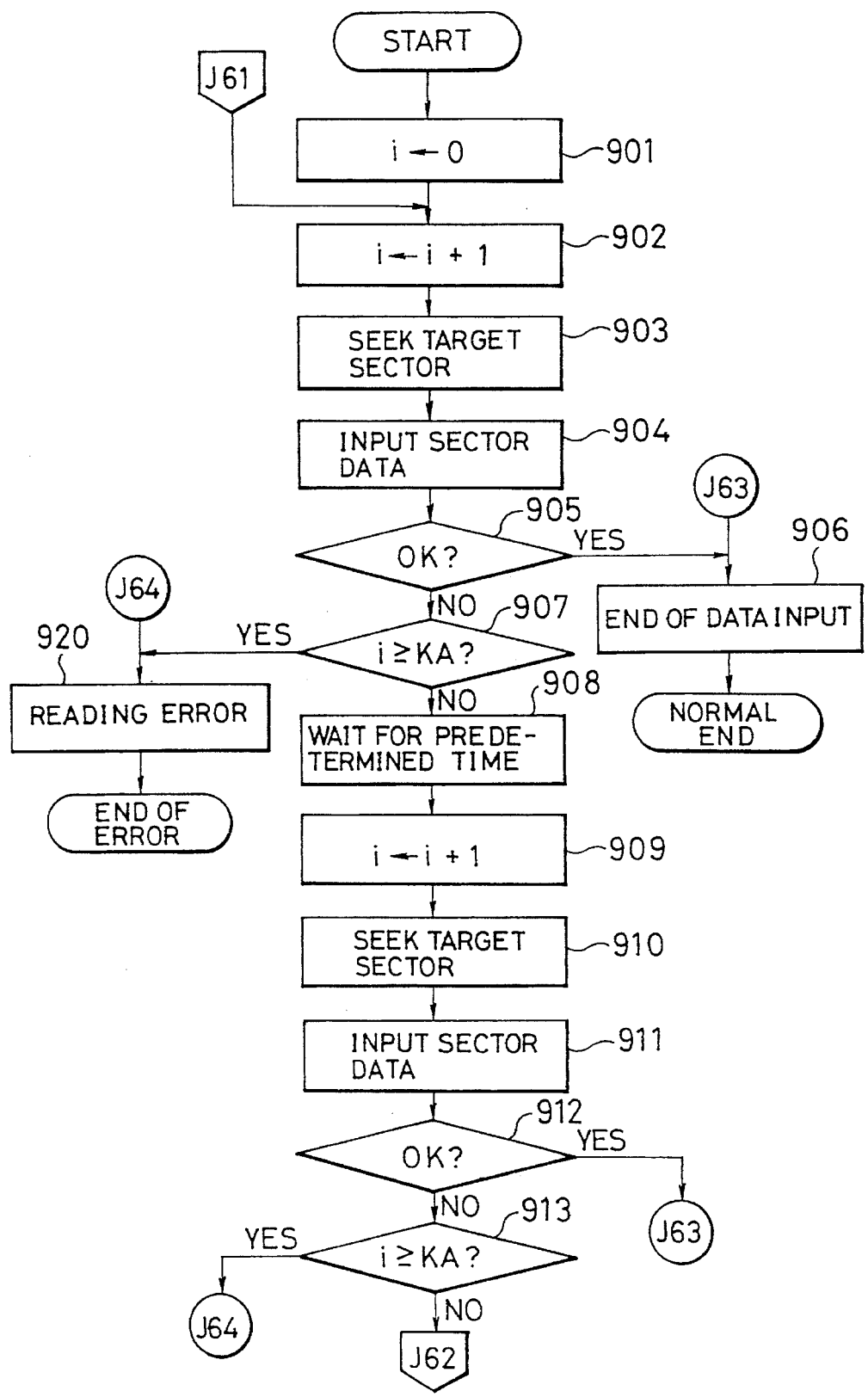
FIG. 20 is a flow chart showing one portion of another processing example at the data reproducing time.

FIGS. 20 and 21 show an example of data reproducing processing in accordance with another embodiment of the present invention.

In this embodiment, when a data error is detected, the operations relative to FIG. 5 are performed after the operations relative to FIG. 4 are performed. Thus, both fine dust and dust having a relatively large size can be removed from the magnetic disk.

In FIG. 20, the counting value of a counter i for judging a reading error is initially set to zero in a processing step 901. The counting value of the counter i is then incremented in a processing step 902. A target sector designated by the host device is sought in a processing step 903. Recorded data in this target sector are inputted in a processing step 904.

In a judging step 905, it is judged whether or not the data recording reproducing circuit 23 detects a data error with respect to the inputted recorded data. When the judgment in the judging step 905 is YES, data are normally inputted from the target sector. Accordingly, the data recording reproducing circuit 23 transmits completion of the data input to the host device in a processing step 906. Thus, this processing step 906 is normally completed.

In contrast to this, when the judgment in the judging step 905 is NO, it is judged in a judging step 907 whether the counting value of the counter i is equal to or greater than a limit value KA indicative of the number of data recording trials. When the judgment in the judging step 907 is NO, the present state of the magnetic disk unit is held for a predetermined time in a processing step 908 to remove dust from the magnetic disk 8.

The counting value of the counter i is next incremented in a processing step 909. A target sector designated by the host device is sought in a processing step 910. Recorded data in this target sector are inputted in a processing step 911.

In a judging step 912, it is judged whether or not the data recording reproducing circuit 23 detects a data error with respect to the inputted recorded data. When the judgment in the judging step 912 is YES, data are normally inputted from the target sector so that it proceeds to the processing step 906.

In contrast to this, when the judgment in the judging step 912 is NO, it is judged in a judging step 913 whether the counting value of the counter i is equal to or greater than the limit value KA indicative of the number of data recording trials. When the judgment in the judging step 913 is NO, a reciprocating interval LA for moving the magnetic head slider member 31 in the radial direction of the magnetic disk 8 is set in a processing step 914 to remove dust from the magnetic disk 8. Further, the number TA of reciprocating movements of the magnetic head slider member 31 is set in a processing step 915.

In a processing step 916, the counting value of a counter k for controlling the number of reciprocating movements of the magnetic head slider member 31 is initially set to zero. High speed reciprocating processing for reciprocating the magnetic head slider member 31 at a high speed is performed at one time in a processing step 917. Further, the counting value of the counter k is incremented in a processing step 918. Next, it is judged in a judging step 919 whether the counting value of the counter k is equal to or greater than the number TA. When the judgment in the judging step 919 is NO, it is returned to the processing step 917 and the high speed reciprocating processing is again performed. In contrast to this, when the judgment in the judging step 919 is YES, it proceeds to the processing step 902 to again read the recorded data from the magnetic disk.

When the judgment in the judging step 907 is YES and the judgment in the judging step 913 is YES, no data error can be dissolved so that the reading error is transmitted to the host device in a processing step 920. Thus, this processing step 920 is completed.

In the above-mentioned embodiments except for the final embodiment, one kind of dust removing processing is performed, but a dust removing operation can be effectively performed by combining these embodiments with each other.

In the above embodiments, the present invention is applied to the magnetic disk of a medium exchanging type, but can be similarly applied to another disk structure if the magnetic disk unit uses a magnetic head moving mechanism of a rotary driving type.

As mentioned above, in accordance with the present invention, a magnetic head slider member is reciprocated in a radial direction of the magnetic disk such that an outside face of the magnetic head slider member can hit against dust. Accordingly, the dust attached to the magnetic disk can be effectively removed therefrom. Further, dust attached onto a recording face of the magnetic disk is removed therefrom by a side rail member of the magnetic head slider member. Accordingly, the dust can be efficiently removed from a recording region in which a data error is caused at a reproducing time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A control method of a magnetic disk unit in which a magnetic head slider member for holding a magnetic head is floated from a recording face of a magnetic disk by an air flow caused by a high speed rotation of the magnetic disk and the magnetic disk unit has a magnetic head moving mechanism for supporting said magnetic head slider member and positioning said magnetic head in a radial direction of the magnetic disk, said control method comprising the steps of:

reciprocating the magnetic head slider member a predetermined number of times within a predetermined range in the radial direction of the magnetic disk, said predetermined range being set according to a radial position of the magnetic head slider member, when a data error is detected when attempting to reproduce data from the magnetic disk; and attempting to reproduce the recorded data in which the data error was detected after reciprocating the magnetic head slider member the predetermined number of times.

2. A control method of a magnetic disk unit as claimed in claim 1, wherein the predetermined range in said radial direction is set to be wider than a size of said magnetic head slider member in a width direction thereof.

3. A control method of a magnetic disk unit as claimed in claim 1, wherein the predetermined range in said radial direction is set such that data is reproduced from a position which is an intermediate position in the radial direction of the magnetic disk.

4. A control method of a magnetic disk unit in which a magnetic head slider member for holding a magnetic head is floated from a recording face of a magnetic disk by an air flow caused by a high speed rotation of the magnetic disk, and the magnetic disk unit has a magnetic head moving mechanism for supporting said magnetic head slider member and positioning said magnetic head in a radial direction of the magnetic disk;

said control method comprising the steps of:

reciprocating the magnetic head slider member a predetermined number of times within a predetermined range in the radial direction of the magnetic disk, said predetermined range being set according to a radial position of the magnetic head slider member, when a data error is detected in recorded data reproduced from the magnetic disk, the reciprocation operation being repeated said predetermined number of times by shifting starting timing of the reciprocation; and attempting to reproduce the recorded data in which the data error has been detected after reciprocating the magnetic head slider member the predetermined number of times.

5. A control method of a magnetic disk unit in which a magnetic head slider member for holding a magnetic head is floated from a recording face of a magnetic disk by an air flow caused by a high speed rotation of the magnetic disk, and the magnetic disk unit has a magnetic head moving mechanism for supporting said magnetic head slider member and positioning said magnetic head in a radial direction of the magnetic disk;

said control method comprising the steps of:

reciprocating the magnetic head slider member a predetermined number of times within a predetermined range in the radial direction of the magnetic disk when a data error is detected in recorded data reproduced from the magnetic disk, said range including a data reproducing position at a moment on which the data error is detected; and attempting to reproduce the recorded data in which the data error has been detected after reciprocating the magnetic head slider member the predetermined number of times.

6. A control method of a magnetic disk unit in which a magnetic head slider member having a magnetic head attached to one of a pair of side rail members arranged in a longitudinal direction thereof is floated from a recording face of a magnetic disk by an air flow caused by a high speed rotation of the magnetic disk, and the magnetic disk unit has a magnetic head moving mechanism for supporting said magnetic head slider member and positioning said magnetic head in a radial direction of the magnetic disk;

said control method comprising the steps of:

holding the other side rail member having no magnetic head in the magnetic head slider member for a predetermined time period in a state in which the other side rail member is moved to a predetermined position in the radial direction of the magnetic head in the radial direction of the magnetic disk when a data error is included in recorded data reproduced from the magnetic disk, said predetermined position being a radial position at which the magnetic head is located during data reproduction; and attempting to reproduce the recorded data in which the data error has been detected after holding the other side rail member for the predetermined time period.

7. A control method of a magnetic disk unit in which a magnetic head slider member having a magnetic head attached to one of a pair of side rail members arranged in a longitudinal direction thereof is floated from a recording face of a magnetic disk by an air flow caused by a high speed rotation of the magnetic disk, and the magnetic disk unit has a magnetic head moving mechanism for supporting said magnetic head slider member and positioning said magnetic head in a radial direction of the magnetic disk;

said control method comprising the steps of:

holding the other side rail member having no magnetic head in the magnetic head slider member for a predetermined time period in a state in which the other side rail member is moved to a predetermined position in the radial direction of the magnetic disk when a data error is detected in recorded data reproduced from the magnetic disk, said predetermined position being a radial position at which the magnetic head is located on data reproducing:

attempting to reproduce the recorded data in which the data error has been detected after holding the other side rail member for the predetermined time period;

reciprocating the magnetic head slider member a predetermined number of times within a predetermined range in the radial direction of the magnetic disk when a data error is again detected in the recorded data reproduced again from the magnetic disk, said range being set according to the radial position of the magnetic head slider member at the moment at which the data error is detected; and reproducing again the recorded data in which the data error has been detected again, after reciprocating the magnetic head slider member the predetermined number of times.

8. A magnetic disk unit in which a magnetic head slider member for holding a magnetic head is floated from a recording face of a magnetic disk by an air flow caused by a high speed rotation of the magnetic disk, and the magnetic disk unit has a magnetic head moving mechanism for supporting said magnetic head slider member and positioning said magnetic head in a radial direction of the magnetic disk;

said magnetic disk unit comprising:

a data error detector for detecting that a data error is included in recorded data reproduced from the magnetic disk; and a controller for reproducing again the recorded data after reciprocating the magnetic head slider member a predetermined number of times within a predetermined range in the radial direction of the magnetic disk, said range being set on a basis of a radial position of the magnetic head slider member when the data error detecting means detects the data error.

* * * * *